US011485384B2

(12) United States Patent
Huang et al.

(10) Patent No.: US 11,485,384 B2
(45) Date of Patent: Nov. 1, 2022

(54) UNSTRUCTURED VEHICLE PATH PLANNER

(71) Applicant: Zoox, Inc., Foster City, CA (US)

(72) Inventors: Zhenqi Huang, San Carlos, CA (US); Janek Hudecek, Redwood City, CA (US); Dhanushka Nirmevan Kularatne, Menlo Park, CA (US); Mark Jonathon McClelland, San Francisco, CA (US); Marin Kobilarov, Mountain View, CA (US)

(73) Assignee: Zoox, Inc., Foster City, CA (US)

( * ) Notice: Subject to any disclaimer, the term of this patent is extended or adjusted under 35 U.S.C. 154(b) by 211 days.

(21) Appl. No.: 16/872,284

(22) Filed: May 11, 2020

(65) Prior Publication Data

US 2021/0347382 A1 Nov. 11, 2021

(51) Int. Cl.
*B60W 60/00* (2020.01)
*G01S 19/39* (2010.01)
*G01C 21/34* (2006.01)
*G01C 21/36* (2006.01)
*G01S 19/42* (2010.01)
*G01S 19/52* (2010.01)
*G05D 1/02* (2020.01)

(52) U.S. Cl.
CPC ..... *B60W 60/0016* (2020.02); *G01C 21/3453* (2013.01); *G01C 21/3691* (2013.01); *G01S 19/393* (2019.08); *G01S 19/42* (2013.01); *G01S 19/52* (2013.01); *G05D 1/0212* (2013.01)

(58) Field of Classification Search
CPC .. B60W 60/0016; G01S 19/393; G01S 19/42; G01S 19/52; G01C 21/3453; G01C 21/3691; G05D 1/0212
See application file for complete search history.

(56) References Cited

U.S. PATENT DOCUMENTS

| 9,227,632 B1* | 1/2016 | Lee ................... B60W 30/0953 |
| 2013/0232104 A1* | 9/2013 | Goyal ....................... G06N 5/02 |
| | | 706/59 |

OTHER PUBLICATIONS

Gonzalez David Sierra et al: "Towards Human-Like Prediction and Decision-Making for Automated Vehicles in Highway Scenarios Towards Human-Like Prediction and Decision-Making for Automated Vehicles in Highway Scenarios", 190 pages (Year: 2019).*

(Continued)

*Primary Examiner* — Anne Marie Antonucci
*Assistant Examiner* — Jingli Wang
(74) *Attorney, Agent, or Firm* — Lee & Hayes, P.C.

(57) ABSTRACT

The techniques discussed herein may comprise an autonomous vehicle guidance system that generates a path for controlling an autonomous vehicle based at least in part on a static object map and/or one or more dynamic object maps. The guidance system may identify a path based at least in part on determining set of nodes and a cost map associated with the static and/or dynamic object, among other costs, pruning the set of nodes, and creating further nodes from the remaining nodes until a computational or other limit is reached. The path output by the techniques may be associated with a cheapest node of the sets of nodes that were generated.

20 Claims, 10 Drawing Sheets

(56) References Cited

OTHER PUBLICATIONS

Fassbender Dennis et al: "Trajectory planning for car-like robots in unknown, unstructured environments", 2014 IEEE/RSJ International Conference on Intelligent Robots and Systems, IEEE, Sep. 14, 2014 (Sep. 14, 2014), pp. 3630-3635.
Gonzalez David Sierra et al: "Towards Human-Like Prediction and Decision-Making for Automated Vehicles in Highway Scenarios Towards Human-Like Prediction and Decision-Making for Automated Vehicles in Highway Scenarios", 190 pages.
Mahapatra N.R et al: "Scalable global and local hashing strategies for duplicate pruning in parallel A graph search", IEEE transactions on parallel and distributed systems, Jul. 1, 1997 (Jul. 1, 1997), pp. 738-756.
The International Search Report and Written Opinion for PCT App No. PCT/US21/31811, dated Aug. 26, 2021, 211 pages.

* cited by examiner

UNSTRUCTURED VEHICLE PATH PLANNER

BACKGROUND

Autonomous vehicles may rely on various pathway indicators such as runway lights, lane markings, and/or the like to navigate. However, an autonomous vehicle may fail to navigate accurately and/or efficiently when such indicators are obscured (e.g., by snow, garbage, sand), degraded (e.g., burned out light, worn out lane markings), and/or invalidated (e.g., an obstruction partially blocks a lane, traffic signage and/or traffic cones indicate an alternate lane that conflicts with original lane markings).

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
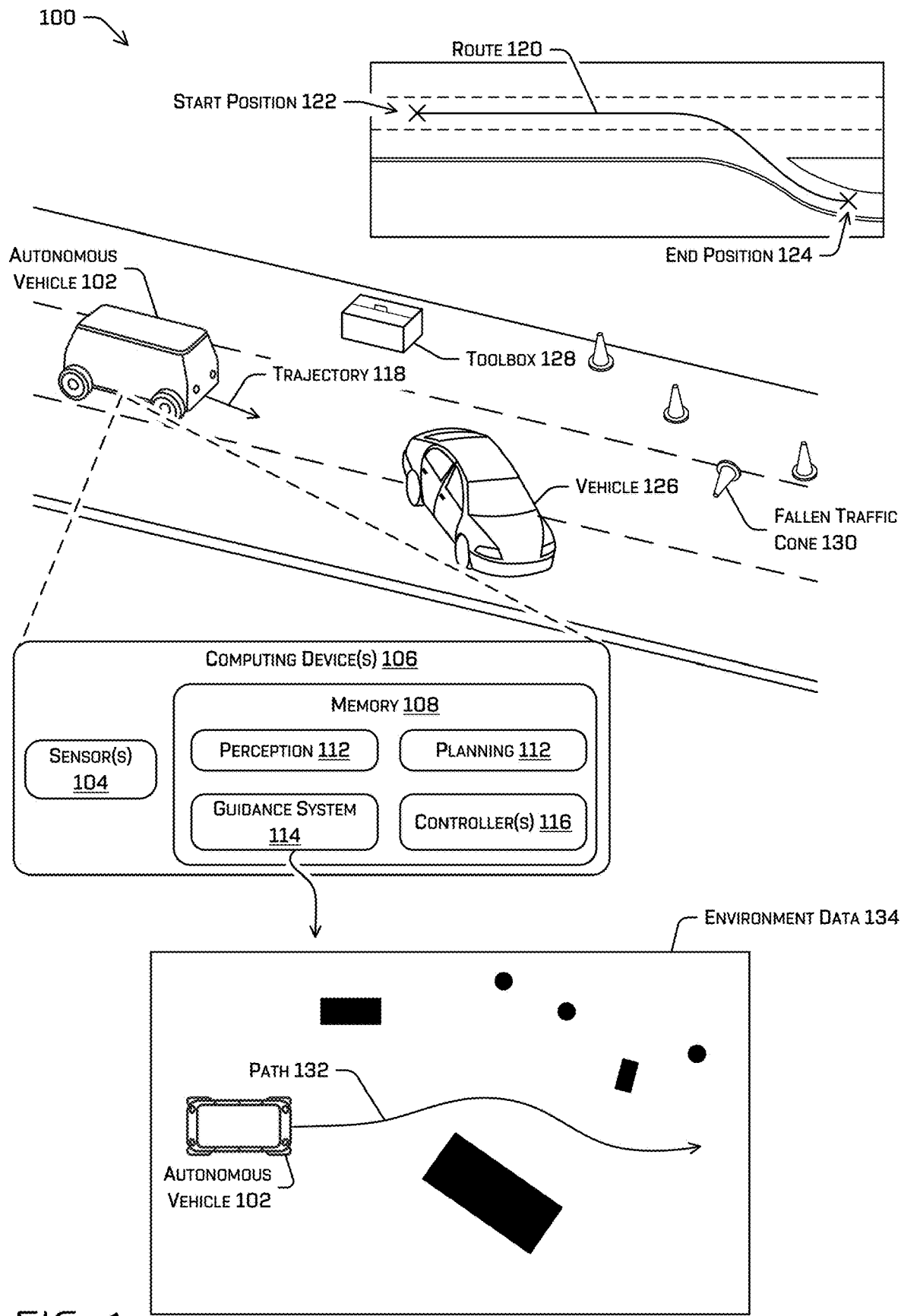
FIG. 1 illustrates an autonomous vehicle and an example scenario in which lane references (whether previously mapped or detected) may not be reliable for determining instructions for controlling motion of the vehicle.

The techniques discussed herein may comprise an autonomous vehicle guidance system that generates a path for controlling an autonomous vehicle based at least in part on a static object map (e.g., a map indicating space occupied by static object(s) and/or "free space" in an environment) and/or one or more dynamic object maps (e.g., a map indicating a likelihood that a location in the environment will be occupied by a moving object or a stationary object that may move at a future time). An autonomous vehicle that includes the guidance system discussed herein may thereby be able to navigate accurately and efficiently, avoiding both static and dynamic (moving or potentially moving) objects, even when the environment is "unstructured" (i.e., the environment does not contain pathway indicators or the pathway indicators are degraded, obscured, and/or obsolete) such as an environment like an open field that does not include markings, a roadway, sidewalks, and/or other similar structures that may serve to identify bounds for operating an autonomous vehicle and/or in a situation where no one lane of a roadway has open space wide enough for a vehicle to operate.

An autonomous vehicle equipped with the guidance system discussed herein may detect that an indicator for generating a path for the vehicle is unavailable (or otherwise determine that the vehicle is unable to proceed given the determined or received indications, such as a lane reference identified by a map stored in a memory accessible to the autonomous vehicle) and determine a path for controlling the autonomous vehicle based at least in part on detecting that an indicator is unavailable. Additionally, or alternatively, the guidance system discussed herein may continuously generate a contingent path that is not (at least primarily) based on an indicator substantially simultaneously as a nominative guidance system (trained to generate a path using a structure and/or an indicator) generates a path that is based at least in part on an indicator. In some examples, if the path generated by the nominative guidance system would result in a collision or is unworkable for another reason (e.g., the path would cause the autonomous vehicle to stop and/or transmit a message to a teleoperations system) then the autonomous vehicle may use the contingent path if the contingent path is collision-free.

As used herein, a route may comprise at least a start position and an end position associated within an environment. In some examples, the start position may identify a current pose (e.g., position and/or heading) of an autonomous vehicle and/or the end position may identify a target pose of the autonomous vehicle. The route may additionally or alternatively identify one or more curves between the start position and end position and/or a vehicle pose in association with the start position and/or end position. For example, the start position may identify a location within a first lane of a roadway and the end position may identify a location within a second lane two city blocks, a right-hand turn, and an additional city block away from the start position. In other words, the route may be a high-level mission of the autonomous vehicle. As used herein, a curve may include a straight line.

The techniques discussed herein may comprise receiving a route, such as by receiving an end location (e.g., which may be specified by a planning component, remote operator, and/or a passenger), determining a current position of the autonomous vehicle (e.g., based at least in part on sensor data received from one or more sensors of the autonomous vehicle, such as a global positioning sensor (GPS), lidar, radar, cameras, and the like, such as may be used in a localization system described herein), and determining the route between the start (current) position and an end position associated with the end location based at least in part on a map stored by the autonomous vehicle. The techniques may comprise determining, based at least in part on a map and/or the vehicle's determination of the existence of lanes, a drivable surface, and/or other indicators, a curve associated with at least a portion of the route. For example, the autonomous vehicle may determine the curve based on a shape of the roadway(s) and/or free space between the start position and the end position.

The autonomous vehicle may generate a path according to the techniques discussed herein to reach the end position specified by the route. In some examples, the start position and end position discussed herein may be associated with a portion of a route. Where the route may specify the roadways and/or the like to be traveled by the autonomous vehicle, the path may specify how the autonomous vehicle will reach the end position (e.g., which lane, position within the lane, heading) over an intermediate distance (e.g., 10 meters, 20 meters, 50 meters, 100 meters). The autonomous vehicle may additionally or alternatively generate a trajectory for controlling the autonomous vehicle based at least in part on the path. The trajectory may be used by the autonomous vehicle to control motion of the autonomous vehicle over a shorter time period/distance than the path (e.g., 5 milliseconds, 10 milliseconds, 0.5 seconds) based at least in part on a receding horizon technique and a position and/or pose specified by the path. In such examples, the trajectory may comprise, for example, any one or more of waypoints and/or desired velocities, accelerations, orientations, steering angles, etc. associated with the one or more waypoints.

In some examples, the techniques may comprise receiving sensor data from a sensor of the autonomous vehicle and generating a static object map and/or dynamic object map based at least in part on the sensor data. The static object map be an occupancy map comprising a map of the environment indicating a likelihood that respective portions of the environment are occupied by an object and/or portions that are free space in which an autonomous vehicle may operate, as discussed in more detail in U.S. patent application Ser. No. 15/900,318, entitled "Creating Clean Maps including Semantic Information;" U.S. patent application Ser. No. 16/147,177, entitled "Radar Spatial Estimation;" U.S. patent application Ser. No. 16/399,743, entitled "Predicting an Occupancy Associated with Occluded Region;" U.S. patent application Ser. No. 16/011,436, entitled "Occlusion Aware Planning;" and U.S. patent application Ser. No. 15/963,833, entitled "Data Segmentation Using Masks;" all of which are incorporated herein by reference. In some instances, the map may additionally or alternatively comprise a probability associated with a location in the occupancy map (e.g., indicating a probability that the corresponding location in the environment is or is not occupied by an object).

The dynamic object map may comprise a map of the environment indicating a likelihood that respective portions of the environment are likely to be occupied by a moving object. For example, a portion of the dynamic object map may indicate a likelihood that a dynamic object will occupy a corresponding portion of the environment at a future time. The dynamic object's current position may be indicated in the static object map or in a first frame of the dynamic object map associated with a current time. In some examples, the dynamic object map may comprise two or more frames, each of the frames being associated with different times (e.g., a current and/or one or more future times). In some examples, the static and/or dynamic object map may additionally or alternatively comprise an indication of a velocity and/or heading of an object, such as may be provided by object tracking, direct velocity measurements (e.g., radar), and the like. Generating the dynamic object map based at least in part on sensor data is discussed in more detail in at least U.S. patent application Ser. No. 15/807,521, entitled "Probabilistic Heat Maps for Behavior Prediction;" U.S. patent application Ser. No. 16/420,050, entitled "Trajectory Prediction on Top-Down Scenes and Associated Model;" U.S. patent application Ser. No. 16/206,877, entitled "Probabilistic Risk Assessment for Trajectory Evaluation;" U.S. patent application Ser. No. 16/504,147, entitled "Prediction on Top-Down Scenes Based on Action Date;" and U.S. patent application Ser. No. 16/399,743, entitled "Predicting an Occupancy Associated with Occluded Region;" all of which are incorporated herein by reference. The static object map and dynamic object map may be collectively referred to herein as environment data.

The techniques may additionally or alternatively comprise determining a cost map based at least in part on the environment data and determining a set of nodes associated with a next time step. In some instances, the cost map may comprise or be associated with a multivariate space. For example, a position in the cost map and/or multivariate space may be associated with a position in the environment, a heading of the vehicle, a velocity of the vehicle, and/or curvature of a trajectory. Determining a node associated with a next time step may comprise determining a location in the multivariate space, which may identify a position in the environment, heading of the vehicle, velocity of the vehicle, and/or curvature of a trajectory, that is reachable from a current position of the vehicle in an interval of time from the current time to the next time step (e.g., 500 milliseconds, 100 milliseconds, 1 second, and/or the like from the current time). Determining the cost map comprise determining a cost associated with a position in the multivariate space, the cost being based at least in part on an occupancy indicated by the static object map, the predicted occupancy indicated by one or more frames of the dynamic object map, a proximity of the position to indication(s) in the static object map and/or dynamic object map, a visitation cost that is based on a difference of a current position and trajectory of a vehicle or position and/or trajectory of a previous node from a trajectory necessary to reach the portion of the multivariate space, and/or the like. In some examples, at least a portion of the cost map may be pre-computed.

The techniques discussed herein may comprise determining successive waves/sets of nodes radiating from a current position of the vehicle in the multivariate space up to an n-th time step, where n is a positive integer. For example, if the time steps are 100 milliseconds each and n is 20, the techniques may comprise determining 20 sets of nodes radiating away from a position of the vehicle, wherein the $20^{th}$ set of nodes is associated with a time that is two seconds in the future. In some examples, a set of nodes may be associated with a time step, e.g., the o-th 100 millisecond interval, and the nodes generated may be based at least in part on one or more nodes selected for exploration. For example, for the first set of nodes, the selected node may be the current position, heading, velocity, and/or trajectory of the vehicle and the first set of nodes may be generated based thereon. However, the second set of nodes may be generated based at least in part on one or more nodes selected from the first set for further exploration, e.g., determining at least part of the second set of nodes may be based at least in part on a node selected from the first set, i.e., the position, heading, velocity, and/or trajectory associated with that selected node. In some examples, nodes generated in a new set may be based on nodes selected from any of the previously generated sets of nodes (e.g., a node from the immediately previous set, a node from a set generated two or more generations previous). For example, the selection may be based at least in part on costs associated with the one or more nodes, such as by selecting the p lowest cost nodes according to the costs associated with the nodes (e.g., which may be determined based at least in part on the cost map, a similarity cost), where p is a positive integer.

The techniques may comprise determining hashes associated with each node of a set of nodes and pruning out any nodes that have a hash that matches the hash of another node. For example, if two nodes have a matching hash, the node that has the higher cost and/or the shorter distance along the route may be discarded as part of the pruning. The techniques may additionally or alternatively comprise determining a p number of the lowest cost nodes of the nodes that remain after pruning. Determining the next set of nodes may be based at least in part on the p nodes selected from the pruned set.

In some examples, hashes for positions in the multivariate space may be precomputed before run-time, so that the hash for a node may be determined based at least in part on a lookup from a hash table. In some examples, a hash may be determined in association with a portion of the multivariate space having dimensions associated with a minimum spacing (resolution) between nodes. For example, the hash table may be associated with a portion having dimensions of a cubic centimeter and a degree azimuth (in a multivariate space comprising potential positions and orientations of the vehicle). Increasing the size of the resolution may increase the number of hash collisions (matches) that occur, effectively increasing the number of nodes that are discarded during the pruning stage and increasing the diversity of the nodes leftover after pruning. Decreasing the resolution may have the opposite effect.

The techniques may comprise determining sets of nodes up until a time limit, compute limit, and/or the n-th set of nodes is determined (i.e., a node set cap is hit). The guidance system may determine one or more contiguous paths through the sets of nodes as the sets of nodes are generated and/or once the time, compute, or node limit is reached. In some examples, the guidance system may trace one or more potential paths through the sets of nodes as they are generated and back-trace a lowest-cost path (i.e., from a node at the end of the potential path in a last layer of nodes to a start point in a first layer of nodes and/or at a current position of the vehicle) to ensure it is collision-free. Regardless, the guidance system may determine a contiguous path through the sets of nodes that is associated with a lowest cost and/or that makes the most progress along the route.

For example, the guidance system may conduct a search for the path from a start position to an end position of at least a portion of the route. Conducting the search may comprise determining a contiguous set of connections between nodes of the different sets of nodes from the start position to the end position. In some examples, the search may be configured with a ruleset that may comprise one or more rules, e.g., specifying a boundary within which to determine the path (e.g., the boundary may be determined based at least in part on sensor data and/or a map), node connection rules (e.g., nodes may have only one parent node), and/or the like. In some examples, the search may comprise determining a directed graph between nodes of the sets of nodes. The directed graph may comprise a connection (e.g., edge) between a first node and a second node and/or weight (e.g., cost) associated with the connection.

In various examples, a path may be determined based at least in part on determining all connections between all nodes in the region and searching for a set of connections therebetween which provide a total minimum cost, which may comprise the costs associated with each motion primitive determined on that path. In at least some examples, such connections may be limited to only those connections between nodes which are feasible. In additional and/or alternate examples, computational resources may be reserved based at least in part on informing a search direction without enumerating all possible connections. Additionally, it is understood, that such connections need not be limited to nodes in successive layers. As a non-limiting example, such a path search may comprise searching nodes between a first layer and any one or more of a second layer, a third layer, a fourth layer, and so on. However, at least in some examples, a node may be generated based on a parent node regardless of the layer at which the node was generated.

In some examples, before conducting a full search for a path, the techniques may comprise determining if a previous path and/or previous connection determined by the guidance system is feasible (e.g., satisfies current constraints such as velocity, maximum steering angle, and/or boundaries; is collision-free; has a cost that is less than a cost threshold).

At least part of determining the contiguous path or the cost map may comprise determining a likelihood of collision associated with a position in the multivariate space. For example, determining the likelihood of collision may include representing the autonomous vehicle as two circles having diameters equal to a width of the autonomous vehicle, where a first circle may be centered at the front axle of the autonomous vehicle and a second circle may be centered at the rear axle of the autonomous vehicle, and determining a distance between the representation and a nearest static object and/or a portion of the environment predicted as being occupied by a dynamic object at a future time. In some examples, the representation of the autonomous vehicle and/or the occupied space indicated by the occupation map may be dilated to account for error (e.g., the diameter of the circle(s) and/or an area indicated as occupied in the occupation may be dilated by half the autonomous vehicle width).

In some examples, the path determined by the guidance system may be a coarse path. For example, the coarse path may identify a position, heading, velocity, and/or curvature of approach for the vehicle to track at a 1 second or 500 millisecond interval, but the components of the vehicle may require or be capable of control over a finer time interval (e.g., 10 milliseconds, 100 milliseconds). In other words, the coarse path may not be smooth enough for the vehicle to track without significant errors. In some examples, a processor of a first type (e.g., a graphics processing unit (GPU)) may determine the cost map, generate the nodes, prune the nodes, and/or determine the path and a processor of a second type may smooth the path generated by the GPU and/or determine a trajectory for controlling the vehicle based at least in part on the smooth path.

The guidance system discussed herein may identify a path as feasible and/or determine a confidence score associated with the path based at least in part on the costs discussed herein. The guidance system may output the path and/or confidence score, which the autonomous vehicle may use to control motion of the autonomous vehicle, e.g., by generating a trajectory based at least in part on the path. In some examples, the guidance system may output a primary path and/or a contingent path. For example, the guidance system may determine the contingent path based at least in part on generating a set of candidate paths, determining that the set comprises two groups of candidate paths based at least in part on a threshold distance (e.g., the two groups may be two distinct homotopic groups), and selecting a primary path from a first group and a contingent path from the second group. In some examples, the primary path may be selected as the primary path based at least in part on determining that the primary path is associated with a first total cost that is less than a second total cost associated with the contingent path. The primary path may be associated with a first total cost and/or the contingent path may be associated with a second total cost that is/are less than a cost threshold and/or may be minimum costs of the respective groups associated therewith.

The techniques discussed herein may improve the safety of a vehicle by improving the vehicle's ability to predict movement and/or behavior of objects in the vehicle's surroundings and plan a path for the vehicle that is collision-free and economical. The techniques may also enable the vehicle to operate in situations where roadway and/or lane markers do not exist or have been annulled.

Example Scenario

FIG. 1 illustrates an example scenario 100 including a vehicle 102. In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 102 is depicted as a land vehicle, vehicle 102 may be a spacecraft, watercraft, and/or the like. In some examples, vehicle 102 may be represented in a simulation as a simulated vehicle. For simplicity, the discussion herein does not distinguish between a simulated vehicle and a real-world vehicle. References to a "vehicle" may therefore reference a simulated and/or a real-world vehicle.

According to the techniques discussed herein, the vehicle 102 may receive sensor data from sensor(s) 104 of the vehicle 102. For example, the sensor(s) 104 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), a depth position sensor (e.g., a lidar sensor, a radar sensor, a sonar sensor, a time of flight (ToF) camera, a depth camera, an ultrasonic, and/or sonar sensor, and/or other depth-sensing sensor), an image sensor (e.g., a camera), an audio sensor (e.g., a microphone), and/or environmental sensor (e.g., a barometer, a hygrometer, etc.).

The sensor(s) 104 may generate sensor data, which may be received by computing device(s) 106 associated with the vehicle 102. However, in other examples, some or all of the sensor(s) 104 and/or computing device(s) 106 may be separate from and/or disposed remotely from the vehicle 102 and data capture, processing, commands, and/or controls may be communicated to/from the vehicle 102 by one or more remote computing devices via wired and/or wireless networks.

Computing device(s) 106 may comprise a memory 108 storing a perception component 110, a planning component 112, guidance system 114, and/or controller(s) 116. In some examples, the planning component 112 may comprise the guidance system 114. The perception component 110, the planning component 112, the guidance system 114, and/or the controller(s) 116 may include one or more machine-learned (ML) models and/or other computer-executable instructions. In general, the perception component 110 may determine what is in the environment surrounding the vehicle 102 and the planning component 112 may determine how to operate the vehicle 102 according to information received from the perception component 110. For example, the planning component 112 may determine trajectory 118 based at least in part on the perception data and/or other information such as, for example, one or more maps, localization information (e.g., where the vehicle 102 is in the environment relative to a map and/or features detected by the perception component 110), and/or a path generated by the guidance system 114.

The trajectory 118 may comprise instructions for controller(s) 116 of the autonomous vehicle 102 to actuate drive components of the vehicle 102 to effectuate a steering angle and/or steering rate, which may result in a vehicle position, vehicle velocity, and/or vehicle acceleration that tracks the path generated by the guidance system. For example, the trajectory 118 may comprise a target heading, target steering angle, target steering rate, target position, target velocity, and/or target acceleration for the controller(s) to track as part of the path. For example, the coarse path generated by the guidance system 114 according to the techniques discussed herein may indicate vehicle positions, headings, velocities, and/or entry/exit curvatures at 500 millisecond time intervals and a smooth path output by the guidance system 114 may comprise such points at a 10 or 100 millisecond interval, which may correspond to a time interval associated with the trajectory 118. In some examples, the controller(s) may comprise software and/or hardware for actuating drive components of the vehicle 102 sufficient to track the trajectory 118. For example, the controller(s) 116 may comprise one or more proportional-integral-derivative (PID) controllers.

In the example scenario 100, the autonomous vehicle 102 has received and/or determined a route 120 defining a start position 122, an end position 124, and a curve between the start position 122 and the end position 124 (note that the curve comprises a straight line and/or one or more curves). For example, the planning component 112 may have determined the route 120 based at least in part on sensor data and an end position received as part of a mission (e.g., from a passenger, from a command center). As used herein, references to a "position" may comprise both a location and/or a pose (e.g., position and/or orientation/heading of the vehicle). In some examples, the route may not comprise end position 124 and may additionally or alternatively comprise a target position, such as a target lane, target relative position (e.g., 10 feet from roadway edge), target object (e.g., follow vehicle, follow passenger, move toward an individual hailing the vehicle), etc.

As the vehicle operates to reach the end position 124, the autonomous vehicle 102 may encounter a scenario like example scenario 100 in which a planner that is reliant on a lane reference (e.g., determined based at least in part on a map and/or localizing the autonomous vehicle 102) to generate a path may not accurately and/or efficiently generate a path. For example, a variety of objects (e.g. a blocking vehicle 126, toolbox 128, and fallen traffic cone 130) cumulatively block all three lanes of the depicted roadway, which may cause another planner to stop the vehicle and/or call teleoperations because no one lane has sufficient room for the autonomous vehicle.

However, the guidance system 114 discussed herein may generate a path 132 based at least in part on environment data 134 generated from sensor data captured by sensor(s) 104. For example, the perception component 112 may generate all or part of environment data 134, which may comprise static data and/or dynamic data. For example, the static data may indicate a likelihood that an object exists at a location in the environment and the dynamic data may indicate a likelihood that an object occupies or will occupy a location in the environment. In some instances, the dynamic data may comprise multiple frames associated with different times steps at intervals up to a prediction horizon (i.e., a maximum time/distance for which dynamic data is predicted).

The techniques discussed herein may additionally or alternatively comprise determining dynamic data based at least in part on a mode of operation of the vehicle. For example, the dynamic data may comprise a first prediction associated with a first vehicle mode and a first time and a second prediction associated with a second vehicle mode and the first time. The vehicle modes may include mission-level modes, such as passenger pickup, passenger transit, passenger drop-off, or the like; path or trajectory-level modes such as maintaining trajectory, slowing to a stop, transitioning lanes, executing a right hand turn, or the like; and/or signal modes, such as activating a speaker, activating a turn light, flickering brights, or the like. The autonomous vehicle's behavior and signals may affect decisions and behavior made by other entities in the vicinity of the autonomous vehicle 102 and may thereby affect the predicted motion of other objects.

In some examples, the perception component 110 may receive sensor data from the sensor(s) 104 and determine data related to objects in the vicinity of the vehicle 102, such as the static and/or dynamic data. The depicted example of the environment data 134 comprising static and/or dynamic data is a top-down representation of such data, but any representation of the static and/or dynamic data is contemplated, such as a heat map, object classifications associated with detected objects, instance segmentation(s), semantic segmentation(s), two and/or three-dimensional bounding boxes, tracks, etc. The perception component 110 may additionally or alternatively determine route data that specifies a destination of the vehicle, global map data that identifies characteristics of roadways (e.g., features detectable in different sensor modalities useful for localizing the autonomous vehicle), local map data that identifies characteristics detected in proximity to the vehicle (e.g., locations and/or dimensions of buildings, trees, fences, fire hydrants, stop signs, and any other feature detectable in various sensor modalities), track data (e.g., the environment representations, object detections, and/or tracks discussed herein), etc.

In some examples, the perception component 110 may comprise a pipeline of hardware and/or software, which may include one or more GPU(s), ML model(s), Kalman filter(s), and/or the like. In some examples, the perception component 110 may monitor as much of the environment surrounding the autonomous vehicle as possible, which may be limited by sensor capabilities, object and/or environmental occlusions (e.g., buildings, elevation changes, objects in front of other objects), and/or environmental effects such as fog, snow, and/or the like. For example, the sensor data may comprise radar data, which the perception component 110 may receive as input. The perception component 110 may be configured to detect as many objects and information about the environment as possible to avoid failing to account for an event or object behavior that should be taken into account by the planning component 112 in determining the trajectory 118.

The object classifications, which may be part of the environment data 134 and determined by the perception component 110, may distinguish between different object types such as, for example, a passenger vehicle, a pedestrian, a bicyclist, a delivery truck, a semi-truck, traffic signage, and/or the like. A track may comprise a historical, current, and/or predicted object position, velocity, acceleration, and/or heading. The data produced by the perception component 110 may be collectively referred to as perception data. Once/as the perception component 110 generates perception data, the perception component 110 may provide the perception data to the planning component 112 and/or the guidance system 114. In some examples, perception data may comprise outputs of sensor specific pipelines (e.g., vision, lidar, radar) and/or hybrid sensor pipelines (e.g. vision-lidar, radar-lidar).

The planning component 112 may use the perception data received from perception component 110 and/or a path received from the guidance system 114, to determine one or more trajectories, control motion of the vehicle 102 to traverse a path or route, and/or otherwise control operation of the vehicle 102, though any such operation may be performed in various other components (e.g., localization may be performed by a localization component, which may be based at least in part on perception data). For example, the planning component 112 may determine a route for the vehicle 102 from a first location to a second location; determine a smooth trajectory from a coarse trajectory received from the guidance system; generate, substantially simultaneously and based at least in part on the path and perception data and/or simulated perception data (which may further include predictions regarding detected objects in such data), a plurality of potential trajectories for controlling motion of the vehicle 102 in accordance with a receding horizon technique (e.g., 1 micro-second, half a second) to control the vehicle to traverse the route (e.g., in order to avoid any of the detected objects); and select one of the potential trajectories as a trajectory 118 of the vehicle 102 that may be used to generate a drive control signal that may be transmitted to the controller(s) 116 for actuating drive components of the vehicle 102. FIG. 1 depicts an example of such a trajectory 118, represented as an arrow indicating a heading, velocity, and/or acceleration, although the trajectory itself may comprise instructions for controller(s), which may, in turn, actuate a drive system of the vehicle 102.

In some examples, the guidance system 114 may be a secondary guidance system to a nominal guidance system of the planning component 112. The planning component 112 may receive a trajectory or path from the nominal guidance system and may receive the path generated by the guidance system 114 as discussed herein. That path received from the guidance system 114 may be treated by the planning component 114 as a contingent path for example, the planning component 112 may rely on an output of the nominal guidance system of the planning component 112 unless or until the output of the nominal guidance system would cause the vehicle 102 to stop or call teleoperations or fails to output a feasible, collision-free, and/or economical path or trajectory. In such an instance, the planning component 112 may switch to using the path output by the guidance system 114. In additional or alternate examples, the planning component 112 may use the path output by the guidance system 114 to generate a trajectory all the time, in certain regions (e.g., in areas with no lane references), based at least in part on sensor data and/or perception data, or the like.

The guidance system 114 may comprise one or more GPUs or may be communicatively coupled with one or more GPUs (e.g., via a publish-subscribe messaging system, via a data bus) and the techniques discussed herein may be parallelized and disseminated to threads of the GPUs, although it is contemplated that the techniques discussed herein may comprise at least portions that are serial.

Example System

Figure 2:
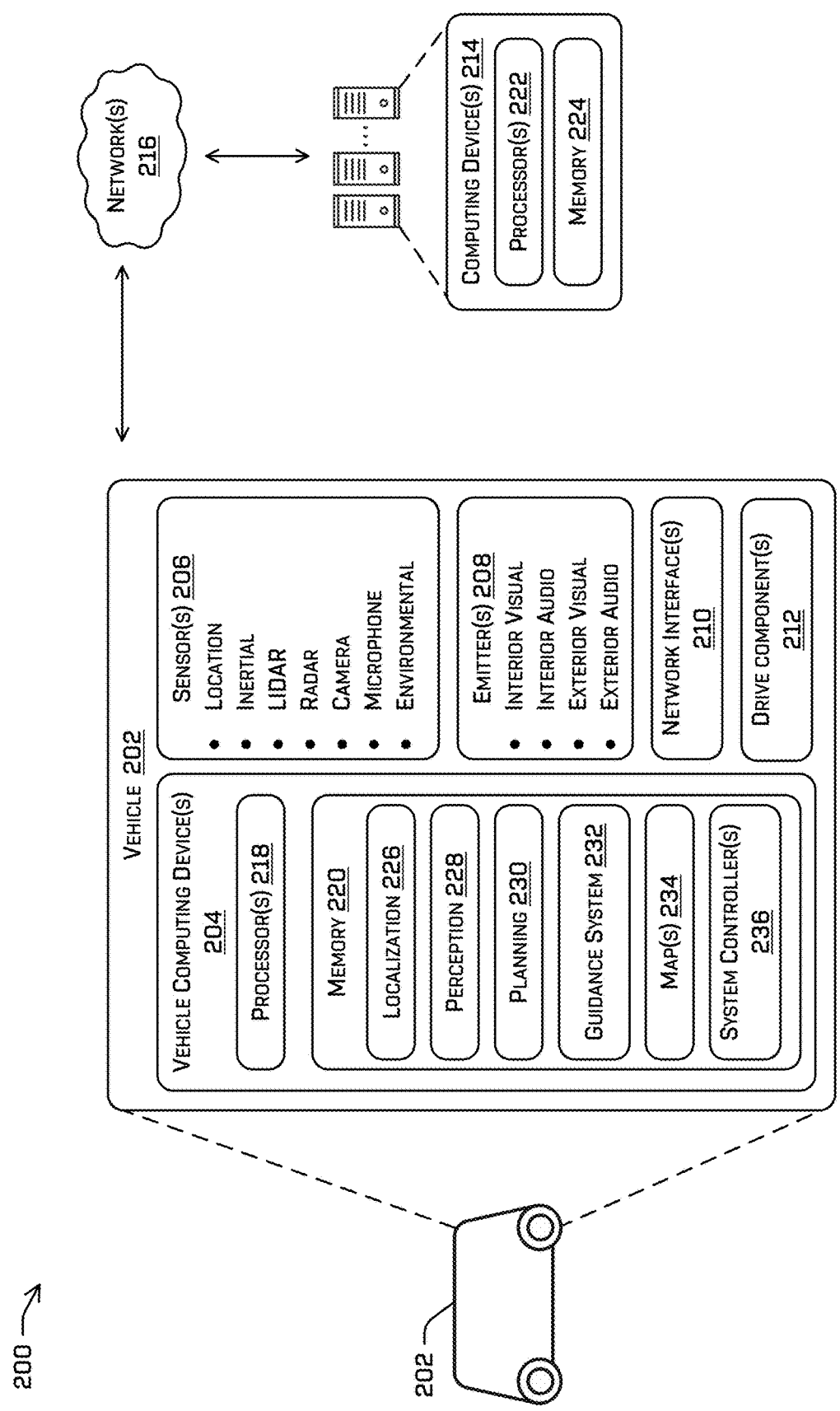
FIG. 2 illustrates a block diagram of an example autonomous vehicle architecture comprising a guidance system for unstructured path planning.

FIG. 2 illustrates a block diagram of an example system 200 that implements the techniques discussed herein. In some instances, the example system 200 may include a vehicle 202, which may represent the vehicle 102 in FIG. 1. In some instances, the vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 202 may be a fully or partially autonomous vehicle having any other level or classification. Moreover, in some instances, the techniques described herein may be usable by non-autonomous vehicles as well.

The vehicle 202 may include a vehicle computing device(s) 204, sensor(s) 206, emitter(s) 208, network interface(s) 210, and/or drive component(s) 212. Vehicle computing device(s) 204 may represent computing device(s) 106 and sensor(s) 206 may represent sensor(s) 104. The system 200 may additionally or alternatively comprise computing device(s) 214.

In some instances, the sensor(s) 206 may represent sensor(s) 104 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 206 may include multiple instances of each of these or other types of sensors. For instance, the radar sensors may include individual radar sensors located at the corners, front, back, sides, and/or top of the vehicle 202. As another example, the cameras may include multiple cameras disposed at various locations about the exterior and/or interior of the vehicle 202. The sensor(s) 206 may provide input to the vehicle computing device(s) 204 and/or to computing device(s) 214.

The vehicle 202 may also include emitter(s) 208 for emitting light and/or sound, as described above. The emitter(s) 208 in this example may include interior audio and visual emitter(s) to communicate with passengers of the vehicle 202. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 208 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 202 may also include network interface(s) 210 that enable communication between the vehicle 202 and one or more other local or remote computing device(s). For instance, the network interface(s) 210 may facilitate communication with other local computing device(s) on the vehicle 202 and/or the drive component(s) 212. Also, the network interface (s) 210 may additionally or alternatively allow the vehicle to communicate with other nearby computing device(s) (e.g., other nearby vehicles, traffic signals, etc.). The network interface(s) 210 may additionally or alternatively enable the vehicle 202 to communicate with computing device(s) 214. In some examples, computing device(s) 214 may comprise one or more nodes of a distributed computing system (e.g., a cloud computing architecture).

The network interface(s) 210 may include physical and/or logical interfaces for connecting the vehicle computing device(s) 204 to another computing device or a network, such as network(s) 216. For example, the network interface(s) 210 may enable Wi-Fi-based communication such as via frequencies defined by the IEEE 200.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 204 and/or the sensor(s) 206 may send sensor data, via the network(s) 216, to the computing device(s) 214 at a particular frequency, after a lapse of a predetermined period of time, in near real-time, etc.

In some instances, the vehicle 202 may include one or more drive components 212. In some instances, the vehicle 202 may have a single drive component 212. In some instances, the drive component(s) 212 may include one or more sensors to detect conditions of the drive component(s) 212 and/or the surroundings of the vehicle 202. By way of example and not limitation, the sensor(s) of the drive component(s) 212 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 212. In some cases, the sensor(s) on the drive component(s) 212 may overlap or supplement corresponding systems of the vehicle 202 (e.g., sensor(s) 206).

The drive component(s) 212 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 212 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 212. Furthermore, the drive component(s) 212 may also include one or more communication connection(s) that enable communication by the respective drive component with one or more other local or remote computing device(s).

The vehicle computing device(s) 204 may include processor(s) 218 and memory 220 communicatively coupled with the one or more processors 218. Memory 220 may represent memory 108. Computing device(s) 214 may also include processor(s) 222, and/or memory 224. The processor (s) 218 and/or 222 may be any suitable processor capable of executing instructions to process data and perform operations as described herein. By way of example and not limitation, the processor(s) 218 and/or 222 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 220 and/or 224 may be examples of non-transitory computer-readable media. The memory 220 and/or 224 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 220 and/or memory 224 may store a localization component 226, perception component 228, planning component 230, guidance system 232 (zero or more portion of which may be hardware, such as GPU(s), CPU(s), and/or other processing unites), map(s) 234, and/or system controller(s) 236. Perception component 228 may represent perception component 110, planning component 230 may represent planning component 112, guidance system 232 may represent guidance system 114, and system controller(s) 236 may represent controller(s) 116.

In at least one example, the localization component 226 may include hardware and/or software to receive data from the sensor(s) 206 to determine a position, velocity, and/or orientation of the vehicle 202 (e.g., one or more of an x-, y-, z-position, roll, pitch, or yaw). For example, the localization component 226 may include and/or request/receive map(s) 234 of an environment and can continuously determine a location, velocity, and/or orientation of the autonomous vehicle within the map(s) 234. In some instances, the localization component 226 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 226 may provide data to various components of the vehicle 202 to determine an initial position of an autonomous vehicle for generating a trajectory and/or for generating map data, as discussed herein. In some examples, localization component 226 may provide, to the perception component 228, a location and/or orientation of the vehicle 202 relative to the environment and/or sensor data associated therewith.

In some instances, perception component 228 may comprise a primary perception system and/or a prediction system implemented in hardware and/or software. The perception component 228 may detect object(s) in in an environment surrounding the vehicle 202 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 228 is referred to as perception data.

The planning component 230 may receive a location and/or orientation of the vehicle 202 from the localization component 226 and/or perception data from the perception component 228 and may determine instructions for controlling operation of the vehicle 202 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 236 and/or drive component(s) 212 may parse/cause to be carried out, second instructions for the emitter(s) 208 may be formatted according to a second format associated therewith).

The guidance system 232 may operate on the vehicle 202 and/or on the computing device(s) 214. In some examples, the guidance system 232 may be upstream from (provide input to) the planning component 230 in a pipeline and downstream (receive input) from at least some components of the perception component 228. The guidance system 232 may be configured to pass all, part, or none of the output of the guidance system 232 to the planning component 230. In some examples, the guidance system 232 may be part of the perception component 228. The guidance system 232 may be configured to generate a coarse path, as discussed herein, which the planning component 230 may use to generate a smooth path and a trajectory that tracks the smooth path or, in an additional or alternate example, the guidance system 232 may determine both the coarse path and the smooth path or may directly compute the smooth path.

The memory 220 and/or 224 may additionally or alternatively store a mapping system (e.g., generating a map based at least in part on sensor data), a planning system, a ride management system, etc. Although localization component 226, perception component 228, planning component 230, guidance system 232, map(s) 234, and/or system controller(s) 236 are illustrated as being stored in memory 220, any of these components may include processor-executable instructions, machine-learned model(s) (e.g., a neural network), and/or hardware and all or part of any of these components may be stored on memory 224 or configured as part of computing device(s) 214.

As described herein, the localization component 226, the perception component 228, the planning component 230, the guidance system 232, and/or other components of the system 200 may comprise one or more ML models. For example, the localization component 226, the perception component 228, the planning component 230, and/or the guidance system 232 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like. In some examples, the ML model discussed herein may comprise PointPillars, SECOND, top-down feature layers (e.g., see U.S. patent application Ser. No. 15/963,833, which is incorporated in its entirety herein), and/or VoxelNet. Architecture latency optimizations may include MobilenetV2, Shufflenet, Channelnet, Peleenet, and/or the like. The ML model may comprise a residual block such as Pixor, in some examples.

In some examples, an ML model may comprise a neural network such as, for example, a convolutional neural network (CNN). As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters. Although discussed in the context of neural networks, any type of machine-learning can be used consistent with this disclosure. In some examples, the guidance system 232 discussed herein and/or an ML model may comprise processor-executable instructions stored in a memory of the computing device(s) 204 and/or accessible thereto, hardware, and/or some combination thereof (e.g., a field-programmable gate array (FPGA), application-specific integrated circuit (ASIC)).

Memory 220 may additionally or alternatively store one or more system controller(s) 236, which may be configured to control steering, propulsion, braking, safety, emitters, communication, and other systems of the vehicle 202. These system controller(s) 236 may communicate with and/or control corresponding systems of the drive component(s) 212 and/or other components of the vehicle 202. For example, the planning component 230 may generate instructions based at least in part on perception data generated by the perception component 228 and/or guidance system 232, and may validate the perception data and/or path generated by the guidance system 232, and/or transmit instructions to the system controller(s) 236. The system controller(s) 236 may control operation of the vehicle 202 based at least in part on the instructions received from the planning component 230.

It should be noted that while FIG. 2 is illustrated as a distributed system, in alternative examples, components of the vehicle 202 may be associated with the computing device(s) 214 and/or components of the computing device(s) 214 may be associated with the vehicle 202. That is, the vehicle 202 may perform one or more of the functions associated with the computing device(s) 214, and vice versa.

Example Dynamic Data

Figure 3A:
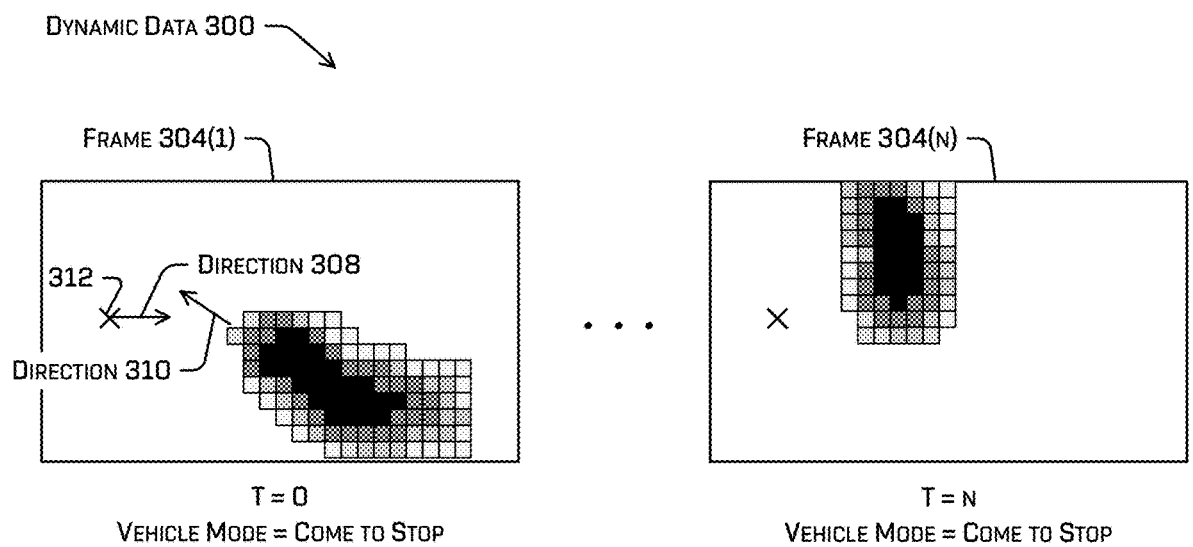
FIG. 3A depicts first example dynamic data predicting motion of a dynamic object at a first time and an n-th time in association with a first mode of operation of the autonomous vehicle.
Figure 3B:
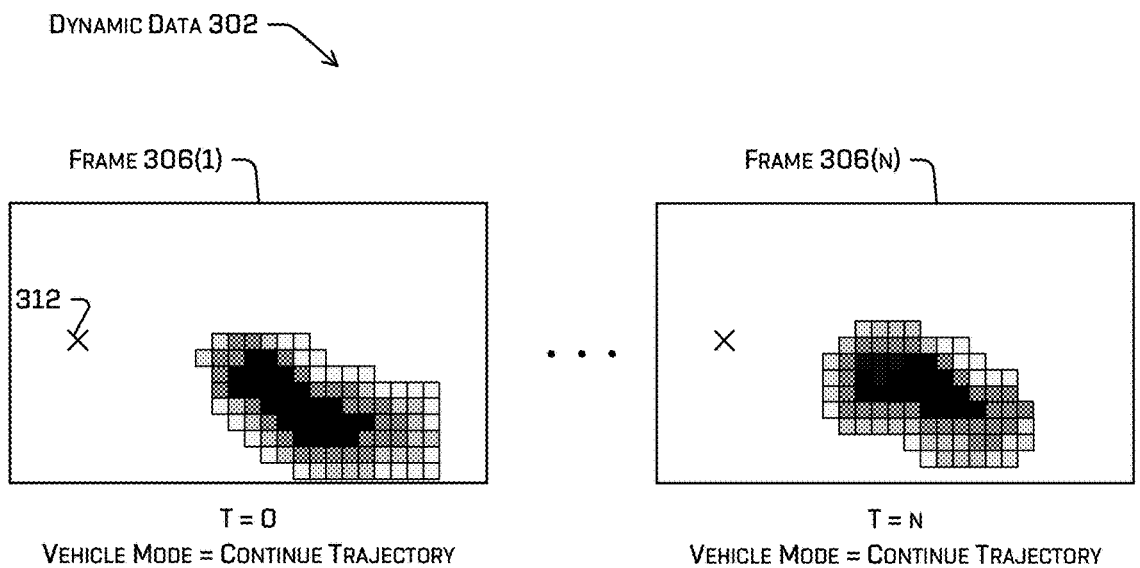
FIG. 3B depicts second example dynamic data predicting motion of a dynamic object at a first time and an n-th time in association with a second mode of operation of the autonomous vehicle.

FIGS. 3A and 3B depict an example of dynamic data 300 and dynamic data 302 that may have been determined by the perception component based at least in part on sensor data associated with an object in an environment surrounding a vehicle. The perception component may comprise one or more ML models that receive sensor data and predict motion of an object. For example, the one or more ML models may output a series of frames, wherein each frame is associated with a different future time. A discrete portion of a frame (e.g., a pixel, a region) may indicate a likelihood that an object will occupy a portion of the environment corresponding to the discrete portion at the time associated with the frame. The depiction illustrates discrete portions as small squares and a likelihood that is zero or less than a threshold as empty space. In other words, only the portions of the dynamic data 300 and 302 that comprise significant (e.g., likelihoods more than a lower threshold) likelihoods are depicted. The likelihood associated with a discrete portion is depicted as shading of the square depicting the discrete portion—the darker the shading, the greater the likelihood. In some examples, the likelihood may be a posterior probability output in association with a portion of an environment based at least in part on sensor data and the architecture of an ML model. The ML model(s) may be additionally or alternatively trained to determine a velocity associated with each discrete portion and a confidence score associated with the velocity.

Both FIGS. 3A and 3B depict predictions for an object represented by the dynamic data 300 and 302 is moving in direction 308 at time t=0 and that the vehicle is at least oriented in direction 310 at time t=0. The vehicle's position 312 is represented as an "x." For example, dynamic data 300 and/or 302 may be associated with a vehicle that is seeking to reverse out of a parking spot in front of the vehicle. Dynamic data 300 may comprise frames 304(1)-(n) and dynamic data 302 may comprise frames 306(1)-(n), wherein each of the frames may be associated with a different future time. In some examples, the interval between the times associated with the frames may be the same interval as the interval between node layers (e.g., 500 milliseconds in one example, although other periods are contemplated). For example, the first time, t=0, may be associated with a current time, and the n-th time may be associated with a prediction horizon, such as t=2 seconds. There may be any number of intervening frames, depending on the period between frames.

In some examples, the ML model(s) may receive a signal indicating a mode of the vehicle as an input in addition to the sensor data. For example, the mode signal may comprise the trajectory output by the planner (e.g., either the trajectory itself or an abstraction thereof, such as "maintaining course," "turning right"), a previously determined path, a mission-level mode (e.g., dropping off a passenger, picking up a passenger, ferrying passengers), an emitter mode (e.g., speaker/horn activation, a turning light state), and/or the like.

Dynamic data 300 and dynamic data 302 illustrate the difference in predictions that may result due to a difference in the mode of the vehicle that is provided as input. FIG. 3A represents dynamic data that may be output by ML model(s) based on a vehicle mode that indicates that the vehicle is coming to a stop, whereas FIG. 3B represents dynamic data that represents that may be output by the ML model(s) based on a vehicle mode that indicates that the vehicle is continuing its trajectory. In sum, FIG. 3A comprises a prediction that the dynamic object may complete a turning maneuver in front of the vehicle, whereas FIG. 3B comprises a prediction that the dynamic object may come to a stop.

The techniques discussed herein may comprise a first ML model that outputs a nominal dynamic object prediction that does not take into account the vehicle mode. In other words, the first ML model is not trained using the vehicle mode, nor does the first ML model receive the vehicle mode as input. The techniques may further comprise training a second ML model to receive the vehicle mode as input and/or the techniques may comprise training different ML models to handle different vehicle modes and selecting between ML models based on the current vehicle mode. Additionally or alternatively, one or more ML models may generate an output at once and the output may be concatenated and provided to the guidance system. For example, dynamic data 300 and 302 may generated by a same or different ML models, but either or both of dynamic data 300 and 302 may be provided to the guidance system. In at least one example, the vehicle mode may be associated with the dynamic data that was generated therefrom. As used herein, dynamic data may refer to a single frame of dynamic object data identifying the likelihood that an object is or will occupy a portion of the environment at a time associated with the frame, a frame that was generated from input comprising vehicle mode, a frame that was generated from input that did not include vehicle mode, multiple frames (e.g., such as all of dynamic data 300), and/or collective dynamic data across multiple vehicle modes (e.g., dynamic data 300 and dynamic data 302).

Example Process

Figure 4A:
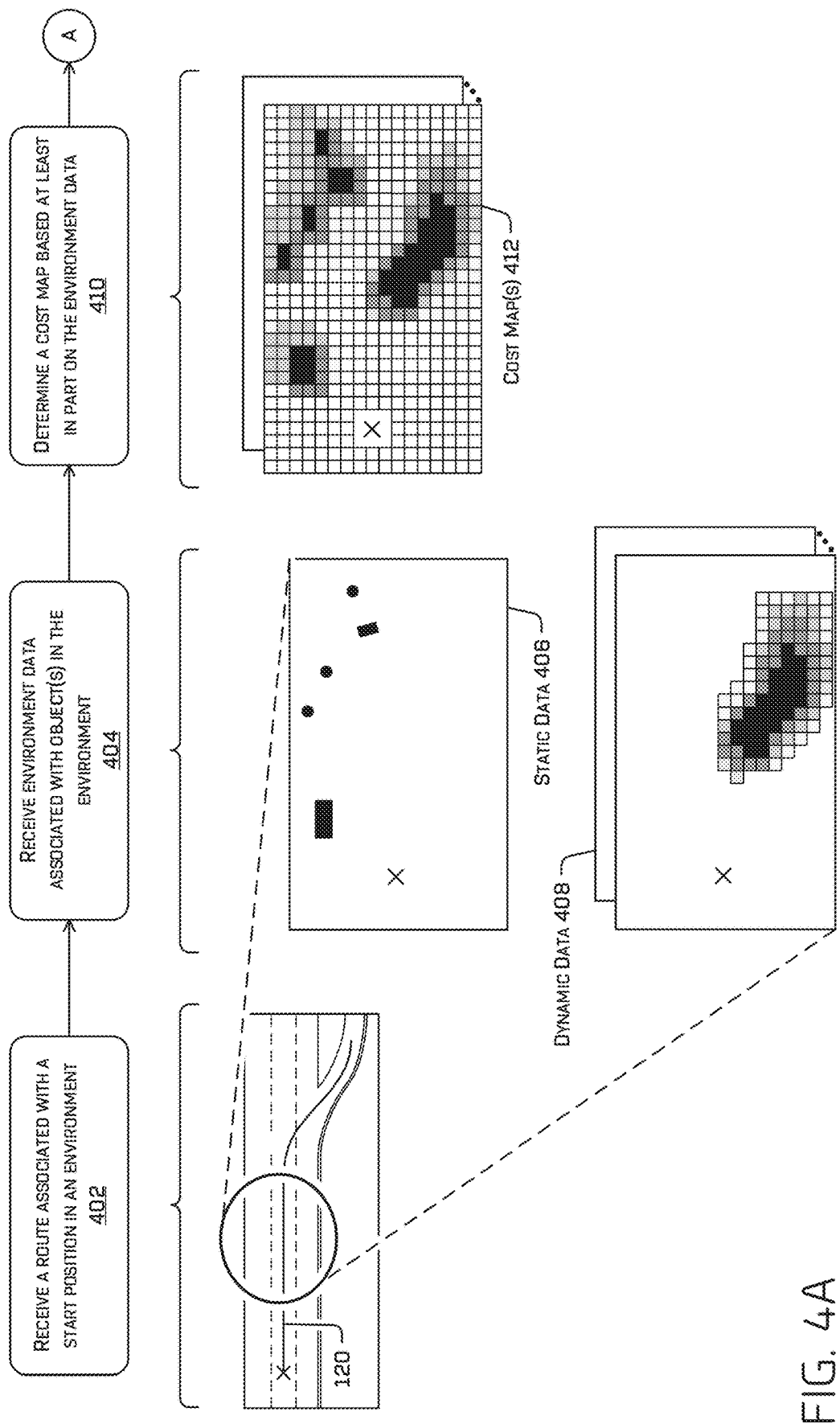
FIGS. 4A-4C illustrates a pictorial flow diagram of an example process for generating a path for controlling an autonomous vehicle based at least in part on environment data, which may be generated from sensor data, and may comprise an occupancy map indicating static objects and/or a dynamic object predicted position and/or velocity probability map.
Figure 4B:
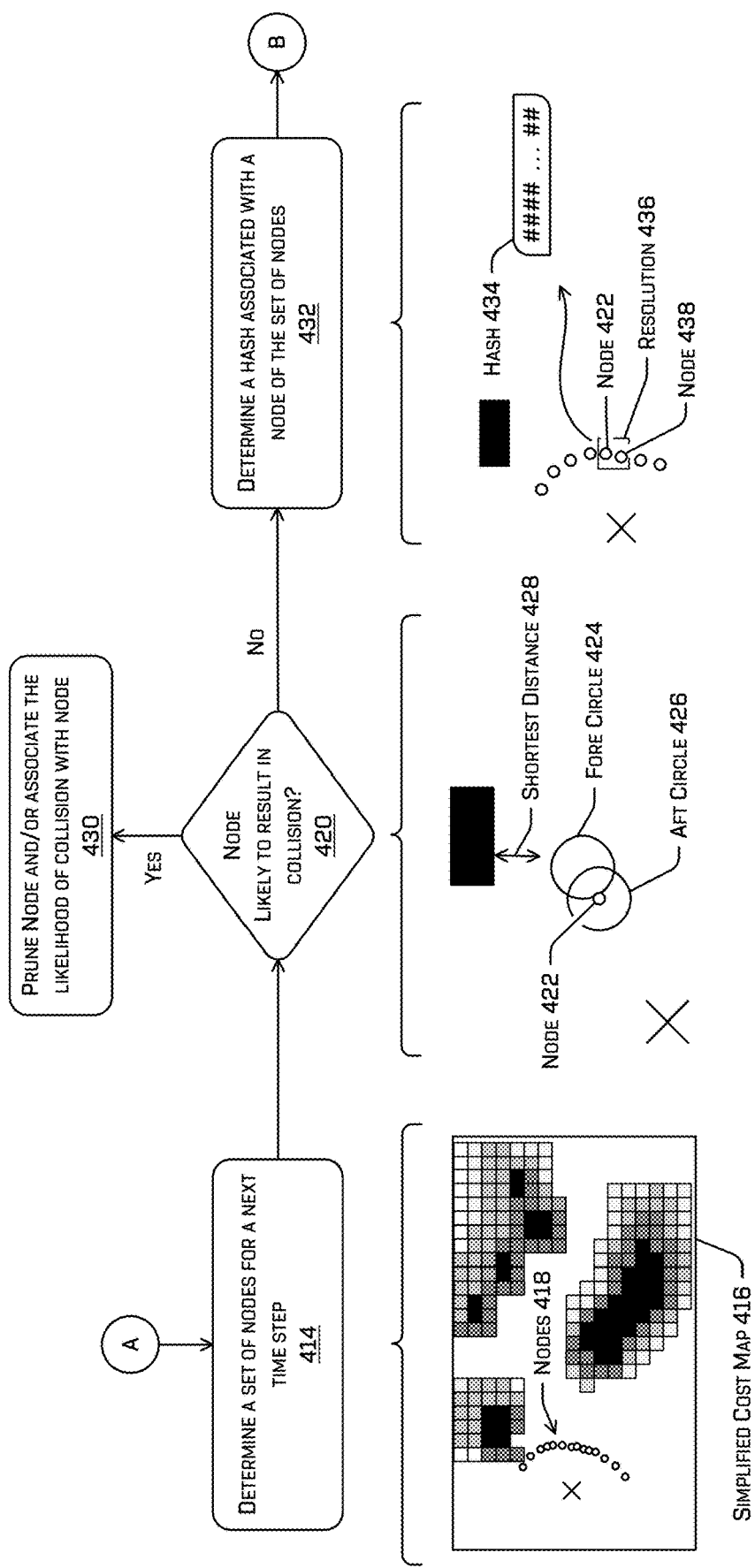
Figure 4C:
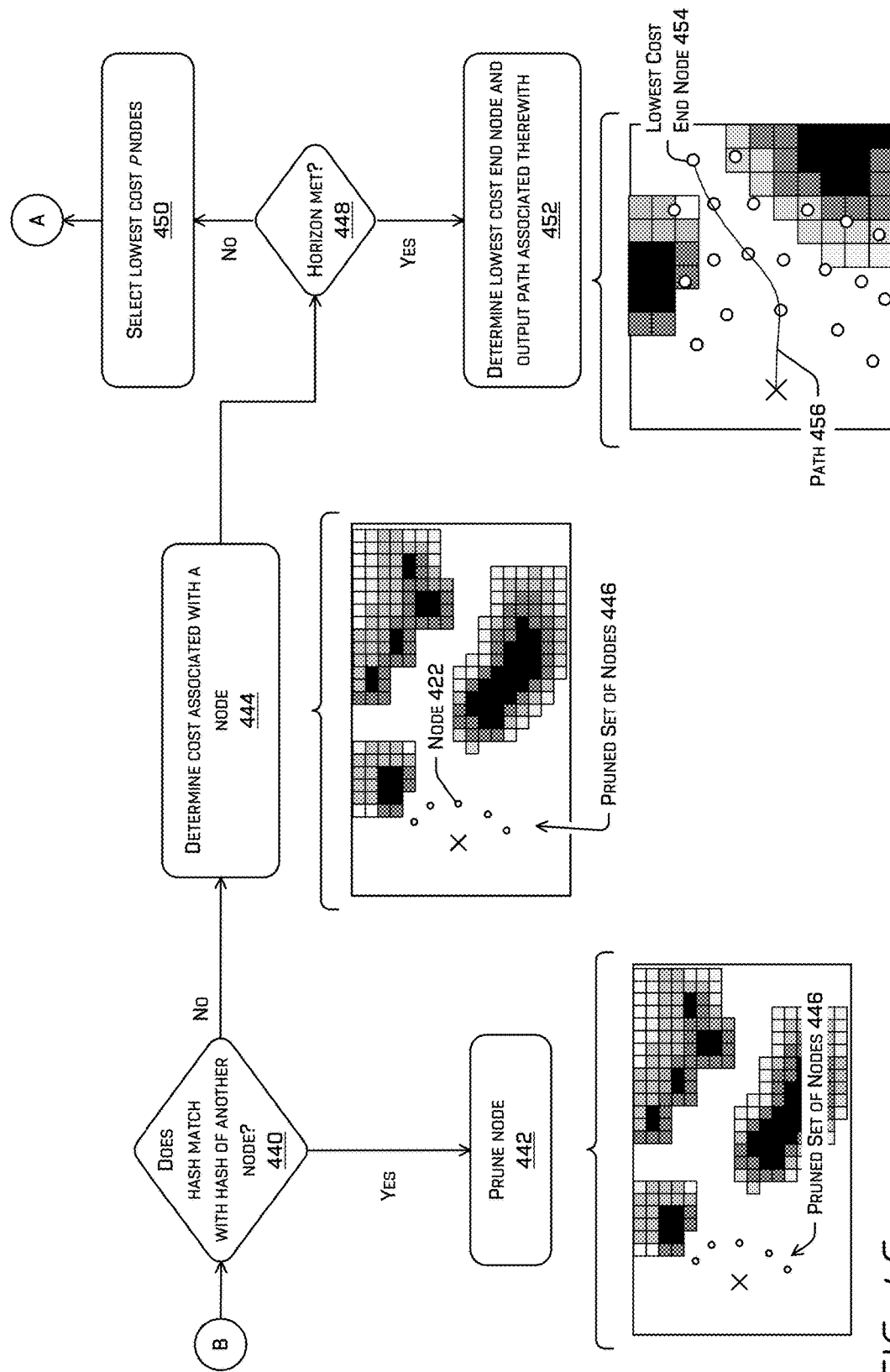

FIGS. 4A-4C illustrates a pictorial flow diagram of an example process 400 for determining a path for controlling an autonomous vehicle based at least in part on environment data, which may be generated from sensor data, and may comprise an occupancy map indicating static objects and/or a dynamic object predicted position and/or velocity map. The operations discussed herein may be used in combination, separately, serially, and/or in parallel may be performed by a same device or different devices. For example, a computing device of an autonomous vehicle may accomplish at least some of the operations and/or a remote computing device (e.g., of a distributed computing service, of a teleoperations system) may accomplish at least some of the operations, although in at least some examples, an autonomous vehicle may accomplish all the operations. Hardware and/or software components of a guidance system may be configured to accomplish at least part of example process 400. In an additional or alternate example, a remote computing device may accomplish at least part of example process 400. In some examples, at least some of the operations of the processes may be precomputed by an autonomous vehicle and/or other computing device(s), such as a distributed computing system.

FIGS. 4A-4C continue to use example scenario 100 as illustrated in FIG. 1.

At operation 402, example process 400 may comprise receiving a route associated with at least a start position in an environment, according to any of the techniques discussed herein. In some examples, receiving the route may additionally or alternatively comprise receiving a start position and a target (e.g., flexible goal) lane or other reference. For example, other references may comprise a highway entrance or exit, an object (e.g., following another vehicle or a passenger that has temporarily left the vehicle), a relative position in an unstructured environment such as an open field, and/or the like. An example route is depicted in FIG. 1 and reproduced in FIG. 4A. In some examples, operation 402 may comprise determining the route based at least in part on a current location of the vehicle (e.g., determined based at least in part on sensor data) and/or an end position (e.g., a termination point of the route, an intermediate point along the route). The route may additionally or alternatively comprise one or more curve(s) (which may include one or more straight lines), which may be determined based at least in part on curvatures associated with the roadways and/or other ways to the end location. Such curve(s) may correspond with and/or be determined based at least in part on a map stored in a memory and/or indicators associated with a roadway (e.g., determining a shape associated with a median, a double yellow line, a shoulder indication, a sidewalk, and/or the like). In various examples, such routes may additionally or alternatively comprise desired lanes in which to drive, streets to take, and the like.

At operation 404, example process 400 may comprise receiving environment data associated with an environment surrounding the vehicle, according to any of the techniques discussed herein. The environment data may comprise data about static objects, static data 406, and/or data about dynamic objects, dynamic data 408. The static data 406 and/or dynamic data 408 may be received from a perception component of the vehicle and/or from a localization and/or mapping component of the vehicle. Note that the dynamic data 408 may indicate that an object is stationary. Such an object may be included in the dynamic data 408 when the perception component associated a track with the object (e.g., the object was previously moving) and/or if the perception component classified the object as an object classification that is associated with a dynamic object identifier. Such object classifications may include, for example, bicyclist, pedestrian, vehicle, animal, and/or the like, whereas building, signage, etc. typically would not be associated with a dynamic object identifier and sensor data related thereto may be amalgamated into the static data 406. More detail regarding path-planning using static object occupancy maps may be found in U.S. patent application Ser. No. 16/517,506, entitled "Unstructured Vehicle Path Planner," the entirety of which is incorporated herein.

In some examples, the size of portions of the environment data indicated as likely being occupied may be dilated to further avoid collisions. In some instances, operation 404 may additionally or alternatively comprise determining a distance map wherein a location in the distance map indicates the distance from the location to a nearest portion indicated in the environment data as being occupied. Note that the distance map may be determined for each time step of the dynamic data 408, one or more of the time steps of the dynamic data 408, and/or an amalgamated distance map may be determined (e.g., an average of multiple distance maps). The static data 406 and/or the dynamic data 408 may indicate likelihoods and/or binary indications that a portion of the environment is/isn't occupied. For example, the static data 406 may indicate the existence of a static object by indicating a maximum likelihood (e.g., 1 in an example where the likelihoods range from 0 to 1 with 1 being a confident indication that an object exists) and the dynamic data 408 may indicate the likely position of an object by a likelihood between 0 and 1 (non-inclusive of 1), although other systems may be used to indicate static and dynamic objects, such as using logits. In some examples, the distance map may be calculated based at least in part on filtering the environment data (i.e., the static data 406 and/or the dynamic data 408) using a likelihood threshold to determine a binary mask. In other words, determining a distance may be based at least in part on the distance from a point in the environment to the nearest portion of the environment data indicating a likelihood equal to or greater than the threshold. Note that the vehicle's position is indicated with an "x."

At operation 410, example process 400 may comprise determining a cost map based at least in part on the environment data, according to any of the techniques discussed herein. For example, operation 410 may include concatenating or otherwise combining the static data 406 and the dynamic data 408 and/or generating cost map(s) 412 for one or more time steps and/or vehicle modes. The interval of time between the cost map(s) may be the same or different than the interval between the dynamic data 408 time steps and/or the time steps between the layers of nodes generated at operation 414. In other words, the dynamic data, cost map, and node generation rates may be generated in association with time steps that are synchronous or asynchronous. As such, interpolation or projection may be required to generate the cost map(s) 412 or to determine a cost associated with a node. In at least one example where interpolation may not be used, the number of cost map(s) 412 may equal a maximum number of layers generated, such that a cost map is generated for each time step for which a node will be generated. Additionally or alternatively, the number of cost maps may be less than the number of layers of nodes.

In some examples, determining the cost map comprise determining a cost associated with reaching a position, heading, velocity, acceleration (e.g., longitudinal and/or lateral acceleration), and/or entry/exit curvature in the environment, although for simplicity the discussion herein predominantly discusses reaching a position. Note that the cost map may be associated with a multivariate space associated with these different metrics (e.g., position, heading, velocity, curvature), which is drastically simplified in the figures. Practically, this means that a first cost may be associated with a position, heading, and velocity, but a different cost may be associated with a different velocity but the same position and heading.

Determining the cost may be based at least in part on a pre-computed field of visitation costs indicating a weight associated with maneuvers required to reach different portions of the multivariate space. The pre-computed field of visitation costs may comprise multiple fields for different speeds (e.g., 5 miles per hour, 15 miles per hour, and so on). For example, the cost of reaching a position and heading ten feet in front of a vehicle may be higher if the velocity at that position is higher or lower than the current speed of the vehicle (e.g., if the vehicle is traveling at 30 miles per hour, a first cost for reaching the same position and heading at 25 miles per hour or 35 miles per hour would be less than a second cost of reaching the same position and heading at 10 miles per hour or 50 miles per hour).

Determining the cost may additionally or alternatively be based at least in part on determining a distance from a position in the cost map to a target reference such as a target lane, determining a distance to a static or dynamic object (which may be based on the distance map that may be determined at operation 404, and/or determining a likelihood of collision based at least in part on the static data 406, the dynamic data 408, and/or the distance map that may be determined at operation 404. For example, the cost may be based on the distance to a nearest object and/or a speed and/or direction of travel of a nearest dynamic object. The cost may additionally or alternatively be based at least in part on a deviation cost that is based at least in part on a deviation of the position, heading, velocity, and/or curvature specified by the position in the multivariate space from the route or other reference point (e.g., a target lane) and/or a displacement along the route. For example, the cost may decrease as displacement along the route increases. Determining the displacement along the route may comprise projecting the point onto the route to and determining a portion of the route that would effectively be traversed. The deviation cost may additionally or alternatively be based at least in part on a deviation of the position, heading, velocity, etc. in the multivariate space from a current position, heading, velocity, etc. of the vehicle.

In some examples, determining a cost may be based at least in part on an object classification associated with an object. For example, different cost functions may be associated with different types of objects since the object's behavior and/or importance may vary. For example, the cost function associated with a static object may not comprise a component to account for movement and a cost function associated with a vehicle may be different than a cost function associated with a pedestrian.

In some examples, operation 410 may comprise determining a cost associated with less than the entirety of the multivariate space. For example, operation 410 may limit the cost determination based at least in part on a current vehicle mode, which may include a speed of the vehicle, and/or the cost determination may be limited to specific nodes determined at operation 414 and/or operation 434. In other words, all, part, or none of the cost map may be computed before one or more nodes are generated. For example, part of the cost map may be determined based at least in part on a distance map determined based at least in part on the environment data and/or a precomputed visitation cost field, but other portions of the cost determination (e.g., collision likelihood cost, similarity cost, route displacement cost) may be determined once a node is determined or as part of the node generation operation.

In some examples, operation 410 (and any of the other operations discussing the dynamic data) may comprise determining a portion of the dynamic data 408 associated with a drive corridor of the vehicle. The drive corridor may be associated with a previous path, the route, or a current trajectory of the vehicle. Determining the portion of the dynamic data 408 may comprise determining a portion of the dynamic data 408 that falls into the drive corridor at one or more of the time steps. In some instances a buffer on either side of the drive corridor may be added to include additional dynamic data 408 for safety. In some examples, determining the cost map may be based on this portion of dynamic data 408 instead of all the dynamic data 408, although if enough computational bandwidth is available, all of the dynamic data 408 may be used.

Turning to FIG. 4B, at operation 414, example process 400 may comprise determining a set of nodes for a next time step (or a next distance), according to any of the techniques discussed herein. FIG. 4B depicts a simplified version of the cost map (simplified cost map 416) so that the representation of the nodes can be more clearly seen. Note that the number and density of the nodes are merely represented for example. The number and density of the nodes and the size of the time steps may be more or less than depicted and described herein. Determining the set of nodes for the next time step may be based at least in part on the position of one or more nodes of any previous layers. In the depicted example, the next time step is the first time step, t=1, so the nodes 418 were determined based on the current position of the vehicle at time t=0, indicated by the "x." A subsequent layer of nodes associated with a second time step, t=2, may be based at least in part on positions of one or more of the nodes 418 in the multivariate space. If each time step corresponds to a 100-millisecond unit of time, the nodes 418 may correspond to different positions, headings, velocities, and/or curvatures at a time 100-milliseconds in the future. A second layer of nodes may correspond to a time 200 milliseconds in the future, and so on until a computational or memory allocation is used up, a target location is reached, and/or until a threshold number of sets of nodes/time steps, n, has been reached.

In some examples, a node may be associated with a control policy such as, for example maintaining a heading and speed, continually changing the steering angle by 5 degrees and decelerating at a specified deceleration, maintaining a heading and speed but nudging away from objects, etc. A node may itself comprise a data structure that indicates the control policy associated with the node, a position in the multivariate space that would be the result of implementing the control policy, a cost to reach the node, a predicted cost of subsequent nodes, a similarity cost, and/or an identification of the parent node associated with the node (e.g., the node upon which the node is based—for example, the parent node may be the starting point for the control policy). Determining the set of nodes may comprise generating a tree where each node has one parent, although in an additional or alternate example, determining the set of nodes may comprise generating a directed acyclic graph (DAG) or any other kind of data structure for relating the nodes. In some examples, a control policy may be dynamically generated by the planning component of a vehicle based at least in part on sensor data, perception data, and/or map data and/or the control policy may be one of a plurality of canonic control policies stored in memory. In some examples, canonic control policies may be associated with different perception data and/or map data states. For example, a control policy for a slow, sharp turn may be unavailable while travelling on a highway above a certain speed but a different control policy for an emergency high speed maneuver may be associated with highway driving.

The cost to reach a node may be a sum of the cost of reaching that node from its parent node (e.g., based at least in part on the cost map, which may take into account the deviation cost, collision cost) and the cost associated with the parent node. In other words, the cost of reaching the node may be the summed cost of each of the nodes that hierarchically precede the node.

The similarity cost of a node may be determined based at least in part on a proximity of the node to a nearest one or more nodes in the multivariate space and/or a matching score between control policies. This similarity cost may be calculated before or after the node generation. In at least one example, the similarity cost may be determined after collision and/or hash pruning, as discussed further below, and added to the total cost associated with the node.

In some examples, determining a node may comprise searching for solutions in the multivariate space that maximize a combination of displacement along the route and lateral/azimuthal diversity among the solutions (or meet a diversity heuristic) and minimize cost based at least in part on the cost map in the time interval given. For example, the search algorithm may comprise an algorithm such as, for example D*, D*lite, Focused Dynamic A*, A*, LPA*, Dijkstra's algorithm, and/or the like, although other search algorithms for searching and/or generating a directed graph and/or a weighted directed graph may be used. In some examples, the search may be based at least in part on constructing a directed graph or a tree based at least in part on the sample nodes and a ruleset. For example, the ruleset may specify that no two nodes of a same layer may be connected and/or minimum and/or maximum distance between connected nodes and/or the like. In some examples, one of the algorithms discussed above may be modified to include the cost parameters discussed herein. In at least one example, a distance from the static data 406 and/or the dynamic data 408, a value thereof, and/or the cost map may be cost parameter(s) that are updated as part of the search algorithm.

In some examples, operation 414 may return m number of nodes identified by the search algorithm as having increased displacement and lateral/azimuthal diversity with lower cost, where m is a positive integer. "Increased" and "lower" meaning that they could have displacement, diversity, and cost values that may or may not be a respective maximum or minimum, on their own, but have been identified by the search algorithm as balancing displacement, diversity, and/or cost. In other words, the search algorithm may seek to optimize the displacement, diversity, and cost of the nodes. For a layer beyond the first layer, the search algorithm may explore up to m number of nodes per node of the previous layer.

At operation 420, example process 400 may comprise determining whether a node 422 is likely to result in a collision, according to any of the techniques discussed herein. For example, this operation may comprise representing positioning the vehicle at the node 422 in the multivariate space. This may comprise representing the vehicle as two circles having diameters equal to a width of the autonomous vehicle, where a first circle may be centered at the front axle of the autonomous vehicle (i.e., fore circle 424) and a second circle may be centered at the rear axle of the autonomous vehicle (aft circle 426), and determining a distance between the representation and a nearest static object and/or a portion of the environment predicted as being occupied by a dynamic object at a future time. In some examples, the node 426 be associated with a position of the back axle (e.g., the center of the aft circle 424), although additional or alternate arrangement are contemplated (e.g., center of overlapping region of circles, center of fore circle 424). In some examples, the representation of the autonomous vehicle and/or the occupied space indicated by the occupation map may be dilated to account for error (e.g., the diameter of the circle(s) and/or an area indicated as occupied in the occupation may be dilated by half the autonomous vehicle width).

Determining whether a node is likely to result in a collision may comprise determining the shortest a distance 428 from either circle to a nearest static or dynamic object. Determining a distance to a dynamic object may comprise determining a distance to a portion of the environment data and/or cost map associated with a likelihood at or above a threshold likelihood. If the distance 428 is shorter than a threshold distance, operation 420 may continue to operation 430; otherwise, operation 420 may continue to operation 432.

At operation 430, example process 400 may comprise pruning the node that may be likely to result in a collision and/or associating the likelihood of collision with the node, according to any of the techniques discussed herein. Pruning the node may comprise removing the node from the tree or graph or associating an indication with the node that the node will result in a collision. The collision indicator may prevent the node from being used as a parent for subsequent nodes and from being selected as part of the final path. Associating the likelihood of collision with the node may comprise modifying a weight associated with the node as part of the cost determination operation at operation 444 (e.g., by increasing the cost).

At operation 432, example process 400 may comprise determining a hash associated with a node of the set of nodes generated at operation 414, according to any of the techniques discussed herein. FIG. 4B depicts an example hash 424 of a node 422 of the set of nodes 418, the hash 434 being represented by a string of numbers and/or characters, depending on the type of hash. In some examples, hashes associated with the multivariate space may be precomputed by a hashing function such that a certain number of bits may be allocated to each dimension of the multivariate space.

For example, if the hashing function is configured to output a 64-bit integer, an x-position in the state space may be indicated by 16 bits of the hash, a y-position may be indicated by 16 bits, the velocity may be indicated by 8 bits, and the yaw may be indicated by 8 bits. The hash function may be designed to generate a hash representing a portion of the multivariate space having dimensions determined based at least in part on a resolution 436 set as a parameter of the hash function; any nodes that are located within the dimensions of that portion of the multivariate space are associated with a same hash 438. The resolution 436 may be used to control the diversity of the nodes generated—the larger the resolution 436, the greater the node diversity (i.e., more nodes will generate a same hash), although this may reduce the total number of nodes after pruning, so the resolution 436 may be tuned so that there are tens of solutions (e.g., 20, 30, 50), although other numbers are contemplated (e.g., 5, 100, hundreds).

According to the depicted example, node 422 and node 438 would both generate hash 424 due to size of the resolution 436. In at least one example, operation 432 may comprise storing a list of hash values of the nodes that have been generated so far during the search. In some examples, the hash of a node may be computed on-vehicle using the hashing function, but in an additional or alternate example, the hash of a node may be computed by looking up the hash in a look-up table from a set of precomputed hashes based on the location of the node in the multivariate space.

Turning to FIG. 4C, at operation 440, example process 400 may comprise determining whether a node's hash matches any other node's hash, according to any of the techniques discussed herein. If a node's hash matches another node's hash, operation 440 may continue to operation 442, by which at least one of the nodes will be pruned, otherwise operation 430 may continue to operation 444. In some examples, operations 440 and 442 may comprise two stages. In a first stage, the hashes of newly generated nodes ("candidate nodes") may be compared amongst each other and pruned and, in a second stage, the hashes of the remaining candidate nodes may be compared to previously generated nodes.

At operation 432, example process 400 may comprise pruning one of nodes associated with the hashes that matched, according to any of the techniques discussed herein. In at least one example, the most recently generated node may be discarded. In an additional or alternate example, the example process 400 may comprise determining a cost associated with each node with a matching hash and may discard all but the node associated with the lowest cost. Discarding the node may remove the node from consideration for use as part of the path and/or may cause subsequent layers of nodes to not be generated based on the pruned nodes location in the multivariate space. If a pruned node is a parent node (i.e., the node has one or more child nodes), the child node(s) thereof may be pruned as well. In some examples, if two hashes collide, the newer of the nodes may be pruned if the two nodes were generated at different node generation operations. For example, if a candidate node collides with a previously generated node (e.g., in stage two of the hash-based pruning), the older of the two nodes (i.e., the node generated in association with a previous node set) may be preserved and the newer node pruned. FIG. 4C depicts an example of a pruned layer of nodes 446. Note that although a hash-based pruning method is described herein other suitable pruning techniques may be used.

At operation 444, example process 400 may comprise determining a cost associated with a node, according to any of the techniques discussed herein. In some examples, operation 444 may be part of operation 410, 414, and/or 420. For example, operation 410 may comprise determining a first portion of a cost associated with a node and operation 444 may comprise determining a second portion of the cost associated with a node. In an additional or alternate example, operation 410 may be reduced or removed (e.g., in an example where generating the nodes is not based on cost) and operation 444 may comprise one or more portions of operation 410 as discussed above. In yet another example, generating the nodes may be based at least in part on determining cost(s) associated with different parts of the multivariate space and/or pruning a node may be based at least in part on determining a cost associated with the node. Other costs may be generated at operation 410, 414, and/or 420, such as a collision cost, deviation cost, visitation cost, and/or the like, although any of these may be calculated at operation 444 (so long as an operation thereafter does not rely on them, such as node generation in an example where the node generation is based on cost).

At least one additional cost that may be calculated after the nodes are generated is a similarity cost. A similarity cost may comprise a weight applied to (weighted/non-weighted) sum of costs discussed above that increases the cost for nodes that are close in the multivariate space. However, if the resolution is correctly tuned, the similarity cost may be small or not used at all.

At operation 448, example process 400 may comprise determining whether a computational horizon has been met, according to any of the techniques discussed herein. For example, operation 448 may comprise determining whether a computational or memory allocation is exhausted, determining that a target location in the environment has been reached by one or more nodes, and/or determining that a threshold number of sets of nodes/time steps, n, has been reached. In other words, if the n-th node set was generated, operation 448 may transition to operation 452, otherwise operation 448 may transition to operation 450 and ultimately return to any one or more of operations 414, 420, 430, 432, 440, 442, 444, and/or 448. For example, example process 400 may iteratively repeat at least some of operations 414, 420, 430, 432, 440, 442, 444, and/or 448 until one of the computational horizons has been met.

At operation 450, example process 400 may comprise selecting the lowest cost p lowest cost nodes for further exploration (unless the horizon is met), according to any of the techniques discussed herein, where p is a positive integer. The lowest cost p nodes may be selected from among the pruned set of nodes. Note that the lowest cost p nodes may comprise node(s) from a most recently generated set of nodes and/or previously generated set(s) of nodes. In some instances, this may cause the algorithm to revert to exploring an older node for a path if the most recently explored nodes become too expensive (e.g., the divergence cost begins to become high causing the algorithm to look for a new path) or result in a collision.

The lowest cost p nodes may be selected for determining a subsequent layer of nodes (i.e., at operation 414). Determining the subsequent layer of nodes (at operation 414) may be based at least in part on exploring a node of the p selected nodes. Exploring a node may comprise determining up to m nodes based at least in part on the node (see nodes 500 determined based at least in part on node 422 in FIG. 5A). As discussed above, exploring the node may comprise determining positions in the multivariate space that would result from implementing different control policies with the explored node as the starting point.

The number of nodes explored by the search algorithm per node of the previous layer, m, may be greater than or equal to the number of nodes p selected at operation 450. The next layer of nodes may comprise up to p·m number of nodes. In some examples, p may be tens, hundreds, or any other number of nodes. Determining the lowest cost p number of nodes may comprise ranking, sorting, and/or otherwise identifying the lowest cost p nodes according to cost determined at operation 446, although in some examples, the nodes may be sorted by cost as they are generated according to enumeration sorting, which may be accomplished by a GPU processing unit.

In some examples, a different core or thread of a first type of processor, such as a GPU, may handle a different one of the node explorations, from among the p number of nodes being explored. For example, a first core or thread may handle generating up to m number of nodes based on a first node of the p nodes, a second core or thread may handle generating up to m number of nodes based on a second node of the p nodes, etc. Cost determinations (e.g., the cost map and/or specific costs associated with a node), hash determination, and/or other steps may similarly be parallelized, although it is understood that a second type of processor may handle any of these or other operations. In some examples, once the nodes have been, the hashes, and/or the costs have been determined, the nodes, hashes, and/or costs may be transmitted to a second type of processor, different from the first type of processor, for processing, which may include operation(s) 430, 432, 434, 448, and/or 450, although the first type or processor may accomplish one or more of these operations.

At operation 452, example process 400 may comprise determining a lowest cost end node and/or outputting a path associated therewith, according to any of the techniques discussed herein. In some examples, the search algorithm may progressively track and/or generate paths and running total costs of the different paths as part of the search algorithms (e.g., this total cost may be identified by a furthest node along one path in the graph or tree as a cost to reach the node), although some search algorithms may determine one or more paths after populating the up to n number of node sets. In at least one example, operation 452 may comprise determining a lowest cost node that is associated with a latest time step (e.g., a node associated with five seconds in the future where five seconds is the maximum time step reached) or displacement along the route. In some examples, since displacement may be part of the cost determination (e.g., reducing the overall cost), the cost may itself reflect the displacement and operation 452 may merely select the lowest cost node. In yet another example, determining the lowest cost node may comprise determining a lowest cost node from among a most recently generated (last) set of nodes (e.g., lowest cost end node 454), instead of among all of the nodes generated.

Additionally or alternatively, determining a path may comprise iteratively determining different combinations of connections between nodes of different node layers and selecting connections to add to a directed graph based at least in part on reducing the running total cost of the combination of connections. In some examples, the search algorithm may do this progressively as the nodes are generated, depending on the algorithm used. For example, the search algorithm may store these connections in a directed graph or tree comprising a connection (e.g., edge) between a first node and a second node and/or weight (e.g., cost) associated with the connection. The cost may be based at least in part on the cost determined at operation(s) 410, 414, 420, and/or 444.

In some examples, operation 452 may comprise determining a path associated with the lowest cost node. In an example where each node only has one parent (e.g., nodes generated according to a tree structure), determining the path 456 may comprise outputting the lowest cost node and all the parents thereof back to the starting position. In an example the nodes are generated according to a graph, determining the path may comprise tracing a lowest cost path back from the node. Outputting the path may comprise outputting the lowest cost node, the cost associated with the lowest cost node, one or more intervening nodes between the lowest cost node and the starting position and/or the cost(s) associated therewith, and/or a trace through the nodes form the lowest cost node to the start position. In some examples, operation 452 may additionally or alternatively comprise outputting multiple paths. For example, operation 452 may output the lowest cost r number of paths, where r is a positive integer, and/or at least two paths in situations where paths that are widely different are created (e.g., one path goes left, another goes right).

For example, path 456 may be a curve, such as a Bezier curves, as illustrated in FIG. 4C, although a path output by the guidance system may comprise a coarse path, which may include a list of the coordinates of the nodes connected by the path (e.g., the positions, headings, velocities specified thereby), linear connections between the nodes, and/or the like. In an example where operation 452 comprises determining a coarse path, example process 400 may further comprise transmitting the coarse path to another component, such as a smoothing component of the planning component, that may receive the coarse path and smooth the coarse path into a smooth path that has curvatures and accelerations that are drivable by the particular type of vehicle being controlled.

Example Iterative Node Layer Generation

FIGS. 5A-5D depict top-down diagrams of the results of successive node generation and pruning operations in the multivariate space, according to the techniques discussed herein. For simplicity, static objects are represented binarily rather than according to their cost map likelihoods, according to the discussion above. Note that the dynamic data associated with the different time steps changes in accordance with the frame of dynamic data associated with the respective time step. Also, note that FIGS. 4A-5D only depict node layers and paths generated for one vehicle mode, although it is contemplated that the guidance system may determine at least a path associated with a current vehicle mode or a nominal vehicle mode (default) and/or up to one path per vehicle mode. FIGS. 5A-5D may depict further iterations of at least some of operations 414, 420, 430, 432, 440, 442, 444, 448, and/or 450 of example process 400 pursuant to the examples depicted in FIGS. 4A-4C.

Figure 5A:
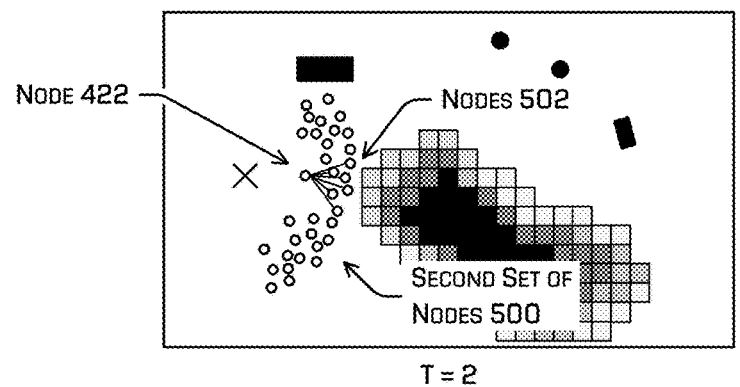
FIGS. 5A-5D depict top-down diagrams of the results of successive node generation and pruning operations according to the techniques discussed herein.

FIG. 5A depicts a top-down representation a second set of nodes 500 generated from the lowest cost p nodes of the first set of nodes (e.g., pruned set of nodes 446). The depiction includes nodes connected by lines to node 422. nodes 500 represent nodes that may be generated based at least in part on node 422 as part of operation 414. The nodes 500 are indicated as being generated from node 422 by lines. In at least one example, a different one of each of the lowest cost p nodes may have been assigned to a different processing unit of a GPU for exploration. For example, a core or a thread of a GPU may have been assigned node 422 and generated nodes 500 in response.

Figure 5B:
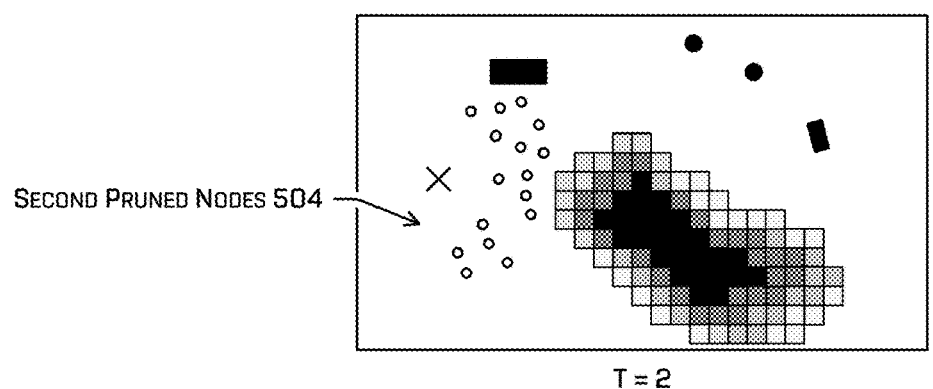
Figure 5C:
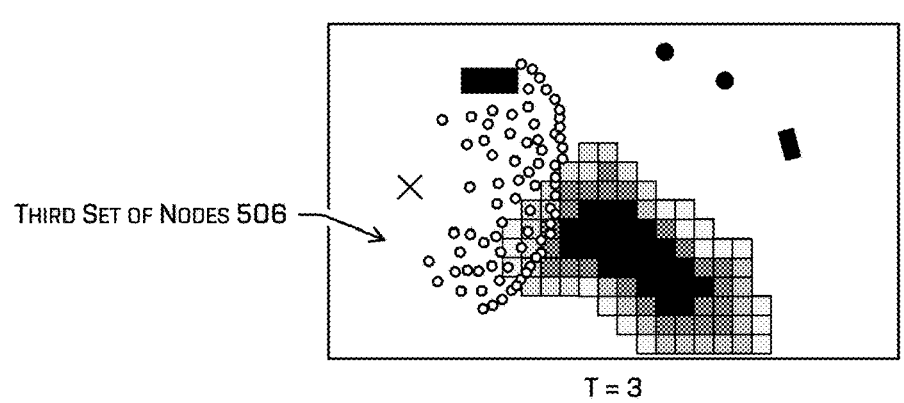
Figure 5D:
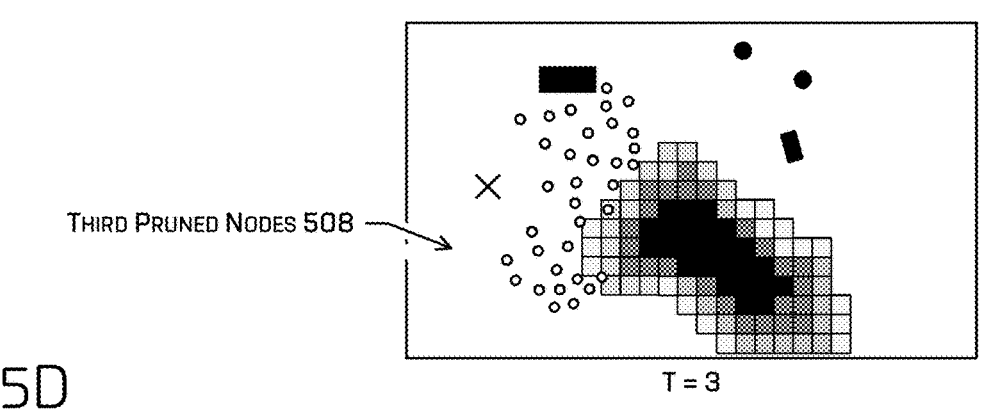

FIG. 5B depicts a top-down representation of the result of pruning the pruned set of nodes 446 and the second set of nodes 500 (i.e., second pruned node(s) 504). Note that the second pruned node(s) 504 includes nodes generated in both the first and second sets of nodes. The lowest cost p nodes of the second pruned node(s) 504 may be selected and used to generate a third set of nodes depicted in FIG. 5C. The may be pruned as the third pruned nodes 508. FIG. 5D depicts a top-down representation of the third pruned nodes 508 that remain after the second pruned node(s) 504 and the third set of nodes 506 are pruned.

Figure 6A:
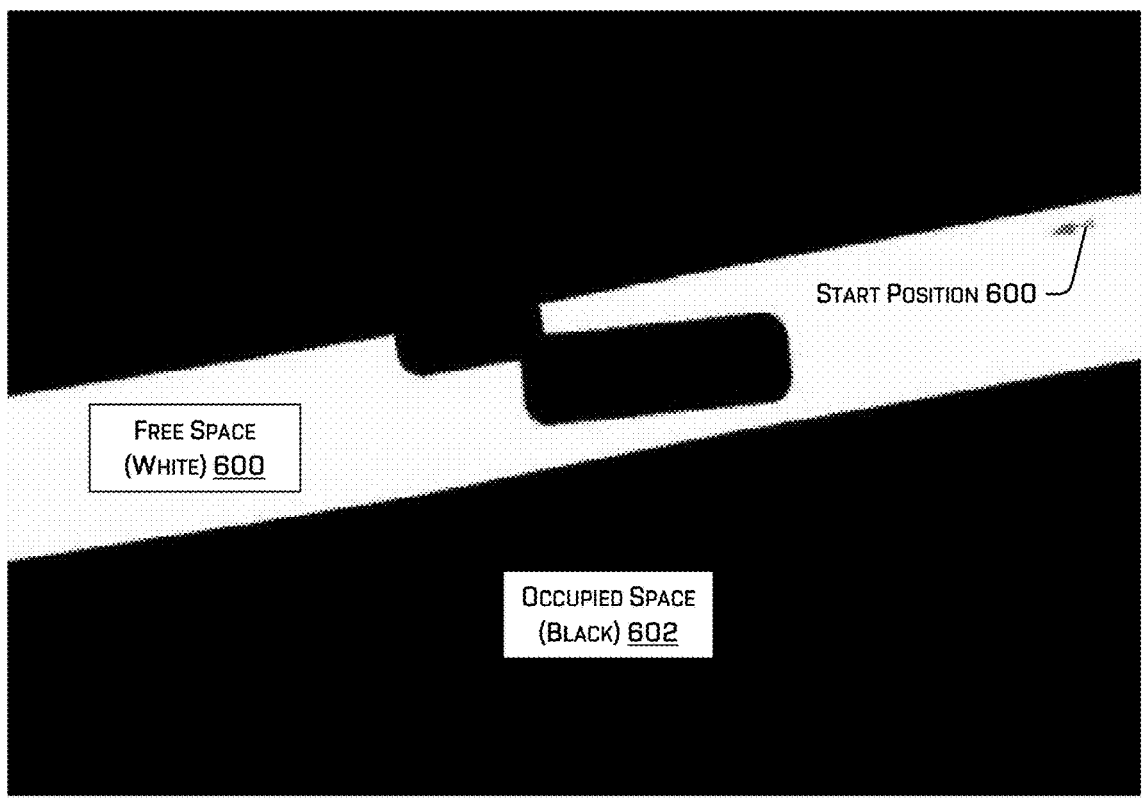
FIGS. 6A-6F depict a top-down representation of an environment and successive sets of nodes generated according to the techniques discussed herein.

FIGS. 6A-6F depict a top-down representation node generation in an environment with two static objects. FIGS. 6A-6F represent free space in white (free space 600), occupied space in black (occupied space 602), and nodes in gray. FIG. 6A depicts the environment and a node associated with a start position 604.

Figure 6B:
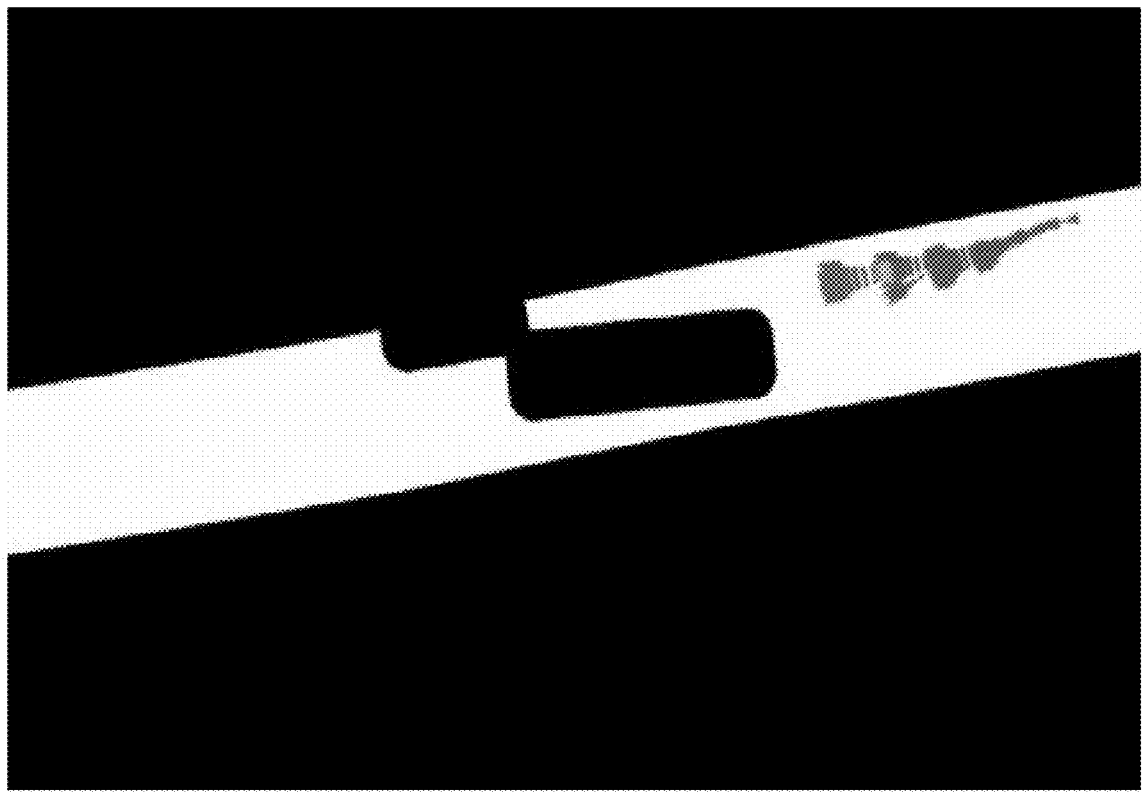

FIG. 6B illustrates the nodes generated after a sixth iteration of node generation.

Figure 6C:
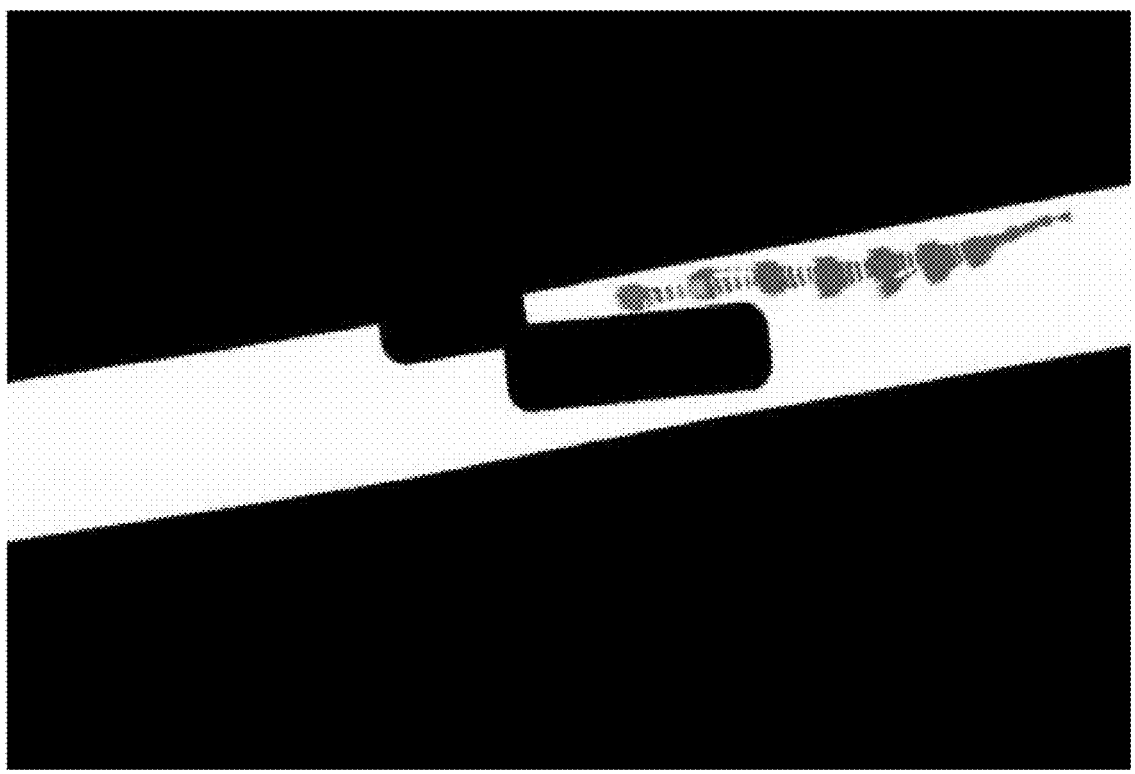

FIG. 6C illustrates the nodes generated after a tenth iteration of node generation.

Figure 6D:
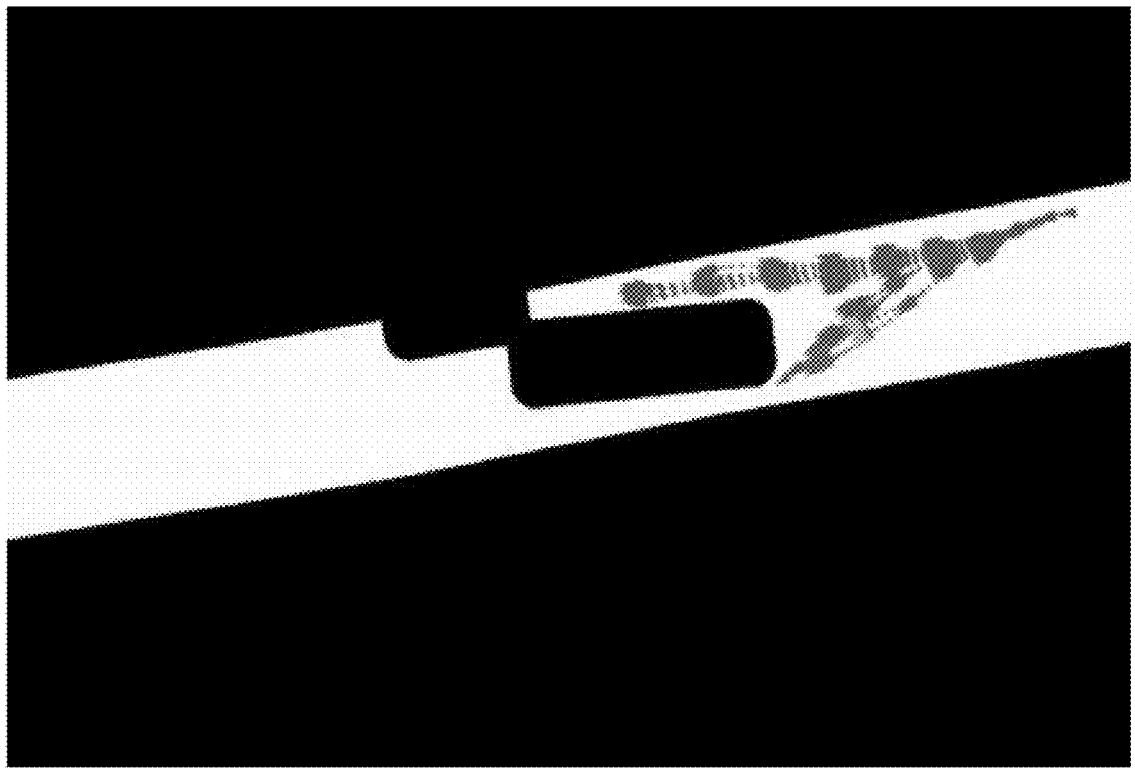

FIG. 6D illustrates the nodes generated after a fifteenth iteration of node generation. FIG. 6D also demonstrates that the lowest cost p nodes for exploration may be node(s) from a set of nodes generated multiple iterations previous.

Figure 6E:
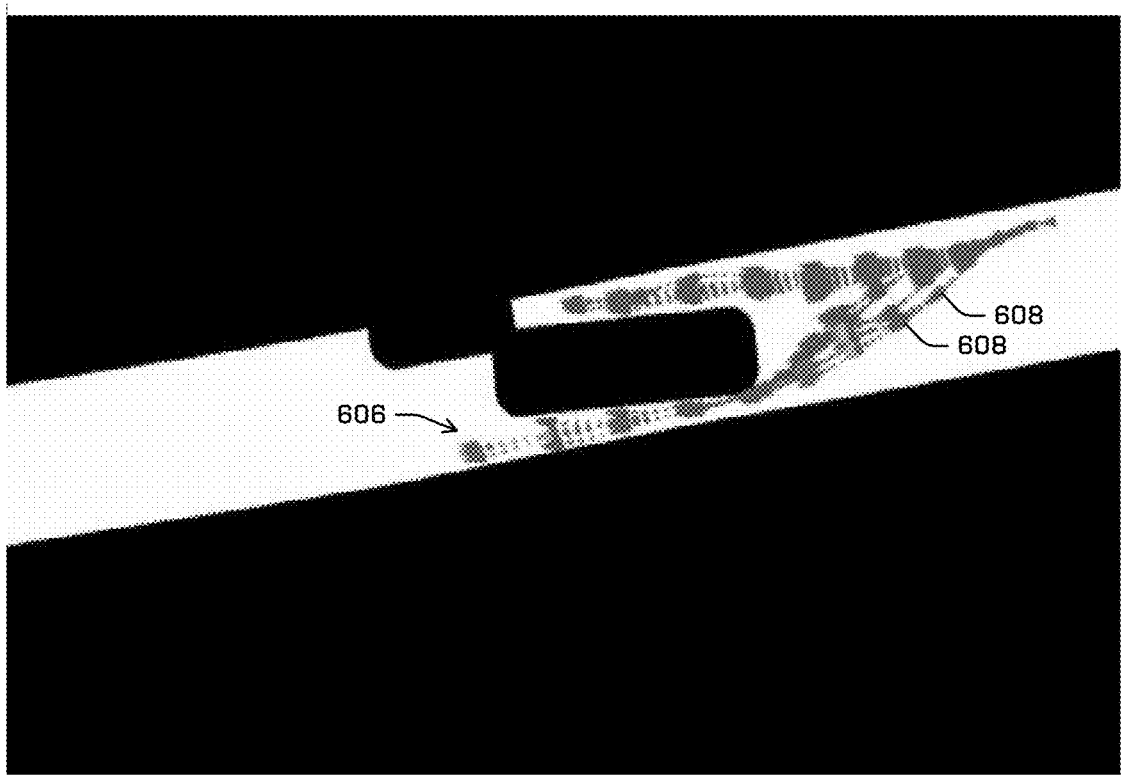

FIG. 6E illustrates the nodes generated after a twentieth iteration of node generation. Note that although there are new nodes that pass the static object (indicated at 606), there are also new nodes that have been added further back that are explorations of an early iteration of node generation—these are indicated at 608.

Figure 6F:
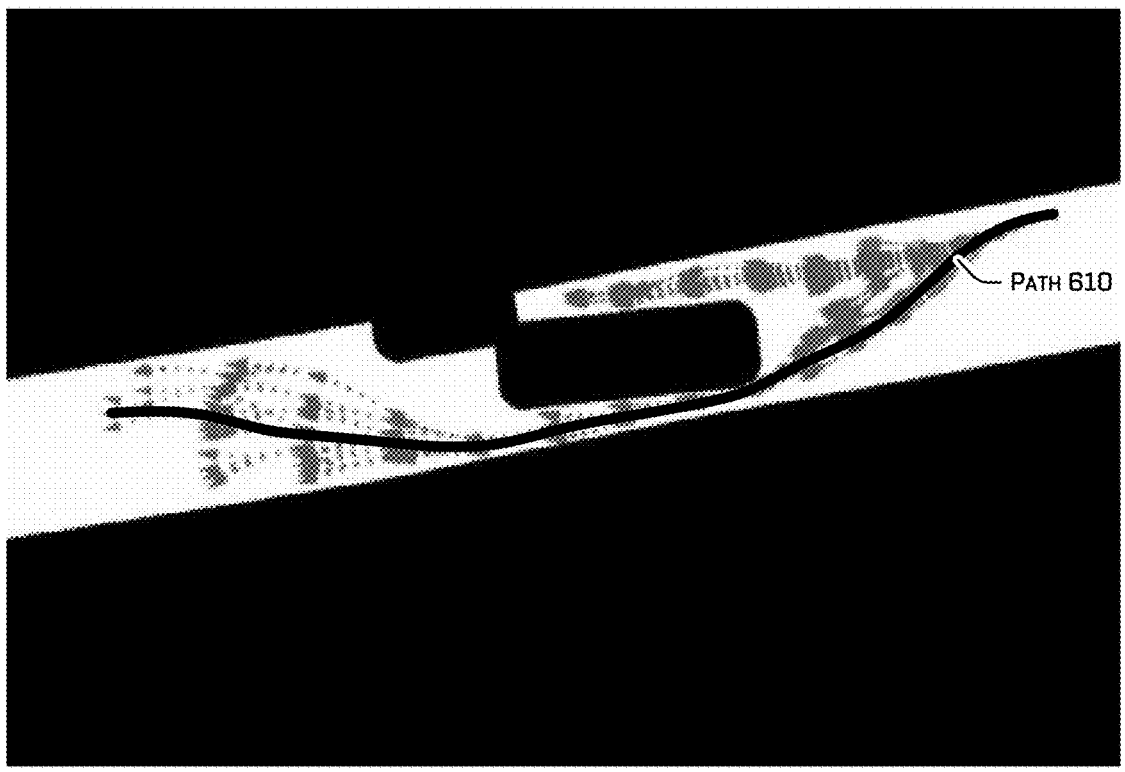

FIG. 6F illustrates the nodes generated after a twenty-fifth iteration of node generation and the output path 610 associated with the lowest cost end node, indicated as a solid line.

Example Clauses

A. A method comprising: receiving a predicted position of a dynamic object in an environment and a probability that the dynamic object will occupy the predicted position at a future time; determining a path for controlling a vehicle based at least in part on the environmental data, wherein determining the path comprises: determining a cost map based at least in part on the environment data; determining first nodes based at least in part on a current position of the vehicle in the environment, the first nodes associated with first candidate trajectories for controlling motion of the vehicle over a first time interval; determining, based at least in part on a pruning technique, a subset of first nodes; determining costs associated with the subset of first nodes, wherein determining the costs comprises determining a cost associated with a node of the subset of first nodes based at least in part on the cost map and a similarity of the node to an additional node; determining, based at least in part on the costs, two or more nodes of the subset having the lowest costs among the costs associated with the subset of first nodes; determining second nodes based at least in part on the two or more nodes; and determining the path based at least in part on second costs associated with the second nodes and the costs associated with the subset of first nodes.

B. The method of paragraph A, wherein determining a node of the second nodes is based at least in part on: determining a future position, velocity, and heading of the vehicle based at least in part on projecting a position, velocity, and heading associated with one of the two or more nodes according to a control policy; and individual nodes of the second nodes are associated with different control policies.

C. The method of either paragraph A or B, wherein the pruning technique comprises: determining hashes associated with the first nodes; determining that the one or more nodes of the first nodes are associated with redundant hashes; and discarding the one or more nodes of the first nodes based at least in part on determining the one or more nodes of the first nodes are associated with redundant hashes.

D. The method of any one of paragraphs A-C, wherein the path is a coarse path defining at least one of a position, heading, or velocity of the vehicle over multiple first time intervals and the method further comprises: refining the coarse path based at least in part on defining a curvature of the path in addition to at least one of the position, heading, or velocity over multiple second time intervals, the second time intervals being shorter than the first time intervals.

E. The method of any one of paragraphs A-D, wherein: the coarse path is determined by a first type of processing unit; and the refined path is determined by a second type of processing unit different from the first type of processing unit.

F. The method of any one of paragraphs A-E, wherein: the future time is a first future time, the probability is a first probability, and the environment data further comprises a second map indicating a second predicted position of the dynamic object and a second probability that the dynamic object will occupy the second predicted position at a second future time later than the first future time; the cost associated with the subset of first nodes is based at least in part on the first probability; and the second costs are based at least in part on the second probability.

G. A system comprising: one or more processors; and a memory storing processor-executable instructions that, when executed by the one or more processors, cause the system to perform operations comprising: receiving a predicted position of a dynamic object in an environment and a probability that the dynamic object will occupy the predicted position at a future time; determining a path for controlling a vehicle based at least in part on the environmental data, wherein determining the path comprises: determining a cost map based at least in part on the environment data; determining first nodes based at least in part on a current position of the vehicle in the environment; determining, based at least in part on a pruning technique, a subset of first nodes; determining costs associated with the subset of first nodes, wherein determining the costs comprises determining a cost associated with a node of the subset of first nodes based at least in part on the cost map and a similarity of the node to one or more other nodes; determining, based at least in part on the costs, two or more nodes of the subset having the lowest costs among the costs associated with the subset of first nodes; determining second nodes based at least in part on the two or more nodes; and determining the path based at least in part on second costs associated with the second nodes and one or more of the costs associated with the subset of first nodes.

H. The system of paragraph G, wherein determining a node of the second nodes is based at least in part on: determining a future position, velocity, and heading of the vehicle based at least in part on projecting a position, velocity, and heading associated with one of the two or more nodes according to a control policy; and individual nodes of the second nodes are associated with different control policies.

I. The system of either paragraph G or H, wherein the path is a coarse path defining at least one of a position, heading, or velocity of the vehicle over multiple first time intervals and the method further comprises: refining the coarse path based at least in part on defining a curvature of the path in addition to at least one of the position, heading, or velocity over multiple second time intervals, the second time intervals being shorter than the first time intervals.

J. The system of any one of paragraphs G-I, wherein: the coarse path is determined by a first type of processing unit; and the smooth path is determined by a second type of processing unit different from the first type of processing unit.

K. The system of any one of paragraphs G-J, wherein: the future time is a first future time, the probability is a first probability, and the environment data further comprises a second map indicating a second predicted position of the dynamic object and a second probability that the dynamic object will occupy the second predicted position at a second future time later than the first future time; the cost associated with the first subset of nodes is based at least in part on the first probability; and the second costs are based at least in part on the second probability.

L. The system of any one of paragraphs G-K, wherein determining the cost map comprises determining a cost associated with at least one of a position, heading, velocity, or curvature in a parameter space associated with the environment, wherein determining the cost is based at least in part on: determining a visitation cost based at least in part on a deviation of at least one of the position, heading, velocity, or curvature from a current position, heading, velocity, or curvature of the vehicle or a target lane; or determining a proximity of the position to a static object, a proximity of the position to the predicted position, or the probability; or determining a deviation of the position, heading, velocity, or curvature from the route or a path reference.

M. The system of any one of paragraphs G-L, wherein determining the cost associated with the node of the subset of first nodes further comprises determining a weight based at least in part on at least one of: a similarity of the first node to a second node of the subset of first nodes; a difference between a lateral position of the first node compared to lateral positions of one or more other nodes of the subset of first nodes; or a distance along the route associated with the first node.

N. A non-transitory computer-readable medium storing processor-executable instructions that, when executed by one or more processors, cause the one or more processors to perform operations comprising: receiving a predicted position of a dynamic object in an environment and a probability that the dynamic object will occupy the predicted position at a future time; determining a path for controlling a vehicle based at least in part on the environmental data, wherein determining the path comprises: determining a cost map based at least in part on the environment data; determining first nodes based at least in part on a current position of the vehicle in the environment; determining, based at least in part on a pruning technique, a subset of first nodes; determining costs associated with the subset of first nodes, wherein determining the costs comprises determining a cost associated with a node of the subset of first nodes based at least in part on the cost map and a similarity of the node to one or more other nodes; determining, based at least in part on the costs, two or more nodes of the subset having the lowest costs among the costs associated with the subset of first nodes; determining second nodes based at least in part on the two or more nodes; and determining the path based at least in part on second costs associated with the second nodes and one or more of the costs associated with the subset of first nodes.

O. The non-transitory computer-readable medium of paragraph N, wherein determining a node of the second nodes is based at least in part on: determining a future position, velocity, and heading of the vehicle based at least in part on projecting a position, velocity, and heading associated with one of the two or more nodes according to a control policy; and a node of the second nodes are associated with a different control policy.

P. The non-transitory computer-readable medium of either paragraph N or O, wherein the pruning technique comprises: determining a set of hashes associated with the first nodes; and determining, as a redundant node, a node of the first nodes associated with redundant hash, and wherein the subset of nodes is exclusive of the redundant node.

Q. The non-transitory computer-readable medium of any one of paragraphs N-P, wherein the path is a coarse path defining at least one of a position, heading, or velocity of the vehicle over multiple first time intervals and the method further comprises: refining the coarse path based at least in part on defining a curvature of the path in addition to at least one of the position, heading, or velocity over multiple second time intervals, the second time intervals being shorter than the first time intervals.

R. The non-transitory computer-readable medium of any one of paragraphs N-Q, wherein: the future time is a first future time, the probability is a first probability, and the environment data further comprises a second map indicating a second predicted position of the dynamic object and a second probability that the dynamic object will occupy the second predicted position at a second future time later than the first future time; the cost associated with the first subset of nodes is based at least in part on the first probability; and the second costs are based at least in part on the second probability.

S. The non-transitory computer-readable medium of any one of paragraphs N-R, wherein determining the cost map comprises determining a cost associated with at least one of a position, heading, velocity, or curvature in a parameter space associated with the environment, wherein determining the cost is based at least in part on: determining a visitation cost based at least in part on a deviation of at least one of the position, heading, velocity, or curvature from a current position, heading, velocity, or curvature of the vehicle or a target lane; determining a proximity of the position to a static object, a proximity of the position to the predicted position, or the probability; or determining a deviation of the position, heading, velocity, or curvature from the route or a path reference.

T. The non-transitory computer-readable medium of any one of paragraphs N-S, wherein determining the cost associated with the node of the subset of first nodes further comprises determining a weight based at least in part on at least one of: a similarity of the first node to a second node of the subset of first nodes; a difference between a lateral position of the first node compared to lateral positions of one or more other nodes of the subset of first nodes; or a distance along the route associated with the first node.

U. The method of any one of paragraphs A-F, wherein the method further comprises determining the environment data based at least in part on sensor data captured by one or more sensors of the vehicle, determining the environment data comprising: receiving an indication of a mode of operation of the vehicle; determining a first prediction of at least one of a position, heading, or velocity of a dynamic object in the environment based at least in part on the mode of operation of the vehicle and the sensor data; and determining a first heat map based at least in part on the first prediction.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:
1. A method comprising:
   determining a cost map based at least in part on environment data, the cost map indicating a predicted position of a dynamic object in an environment and a probability that the dynamic object will occupy the predicted position at a future time;

determining first nodes based at least in part on a current position of a vehicle in the environment, the first nodes associated with first candidate trajectories for controlling motion of the vehicle over a first time interval;
determining, based at least in part on a pruning technique, a subset of the first nodes;
determining first costs associated with the subset of the first nodes, wherein determining the first costs comprises determining a cost associated with a node of the subset of the first nodes based at least in part on the cost map and a similarity of the node to an additional node;
determining, based at least in part on the first costs, two or more nodes of the subset of the first nodes having lowest costs among the first costs associated with the subset of the first nodes;
determining second nodes based at least in part on the two or more nodes;
determining a path based at least in part on second costs associated with the second nodes and the first costs associated with the subset of the first nodes; and
causing the vehicle to navigate along the path.

2. The method of claim 1, wherein determining the second nodes is based at least in part on:
determining a future position, velocity, and heading of the vehicle based at least in part on projecting a position, velocity, and heading associated with one of the two or more nodes according to a control policy; and
individual nodes of the second nodes are associated with different control policies.

3. The method of claim 1, wherein the node is a first node, and wherein the pruning technique comprises:
determining hashes associated with the first nodes;
determining that the first node of the first nodes and a second node of the first nodes are associated with redundant hashes;
determining a first cost associated with the first node;
determining a second cost associated with the second node; and
discarding the first node based at least in part on the redundant hashes, the first cost, and the second cost.

4. The method of claim 1, wherein the path is a coarse path defining at least one of a position, heading, or velocity of the vehicle over multiple first time intervals and the method further comprises:
refining the coarse path based at least in part on defining a curvature of the path in addition to at least one of the position, heading, or velocity over multiple second time intervals to obtain a refined path, the second time intervals being shorter than the first time intervals.

5. The method of claim 4, wherein:
the coarse path is determined by a first type of processing unit; and
the refined path is determined by a second type of processing unit different from the first type of processing unit.

6. The method of claim 1, wherein:
the future time is a first future time;
the probability is a first probability;
the method further comprises determining a second cost map indicating a second predicted position of the dynamic object and a second probability that the dynamic object will occupy the second predicted position at a second future time later than the first future time;
and
the second costs are based at least in part on the second probability.

7. A system comprising:
one or more processors; and
a memory storing processor-executable instructions that, when executed by the one or more processors, cause the system to perform operations comprising:
determining a cost map based at least in part on environment data, the cost map indicating a predicted position of a dynamic object in an environment and a probability that the dynamic object will occupy the predicted position at a future time;
determining first nodes based at least in part on a current position of a vehicle in the environment;
determining, based at least in part on a pruning technique, a subset of the first nodes;
determining first costs associated with the subset of the first nodes, wherein determining the first costs comprises determining a cost associated with a node of the subset of the first nodes based at least in part on the cost map and a similarity of the node to one or more other nodes;
determining, based at least in part on the first costs, two or more nodes of the subset of the first nodes having lowest costs among the first costs associated with the subset of the first nodes;
determining second nodes based at least in part on the two or more nodes;
determining a path based at least in part on second costs associated with the second nodes and one or more of the first costs associated with the subset of the first nodes; and
causing the vehicle to navigate along the path.

8. The system of claim 7, wherein determining the second nodes is based at least in part on:
determining a future position, velocity, and heading of the vehicle based at least in part on projecting a position, velocity, and heading associated with one of the two or more nodes according to a control policy; and
individual nodes of the second nodes are associated with different control policies.

9. The system of claim 7, wherein the path is a coarse path defining at least one of a position, heading, or velocity of the vehicle over multiple first time intervals and the operations further comprising:
refining the coarse path based at least in part on defining a curvature of the path in addition to at least one of the position, heading, or velocity over multiple second time intervals to obtain a smooth path, the second time intervals being shorter than the first time intervals.

10. The system of claim 9, wherein:
the coarse path is determined by a first type of processing unit; and
the smooth path is determined by a second type of processing unit different from the first type of processing unit.

11. The system of claim 7, wherein:
the future time is a first future time;
the probability is a first probability;
the operations further comprise determining a second cost map indicating a second predicted position of the dynamic object and a second probability that the dynamic object will occupy the second predicted position at a second future time later than the first future time;
and
the second costs are based at least in part on the second probability.

12. The system of claim 7, wherein the cost is a first cost and determining the cost map is further based at least in part on a second cost associated with at least one of a position, heading, velocity, or curvature in a parameter space associated with the environment, wherein determining the second cost is based at least in part on:
   determining a visitation cost based at least in part on a deviation of at least one of the position, heading, velocity, or curvature from a current position, heading, velocity, or curvature of the vehicle or a target lane; or
   determining a proximity of the position to a static object, a proximity of the position to the predicted position, or the probability; or
   determining a deviation of the position, heading, velocity, or curvature from the path or a path reference.

13. The system of claim 7, wherein the node is a first node, and determining the cost associated with the first node of the subset of first nodes further comprises determining a weight based at least in part on at least one of:
   a similarity of the first node to a second node of the subset of first nodes;
   a difference between a lateral position of the first node compared to lateral positions of one or more other nodes of the subset of first nodes; or
   a distance along the path associated with the first node.

14. A non-transitory computer-readable medium storing processor-executable instructions that, when executed by one or more processors, cause the one or more processors to perform operations comprising:
   determining a cost map based at least in part on environment data, the cost map indicating a predicted position of a dynamic object in an environment and a probability that the dynamic object will occupy the predicted position at a future time;
   determining first nodes based at least in part on a current position of a vehicle in the environment;
   determining, based at least in part on a pruning technique, a subset of the first nodes;
   determining first costs associated with the subset of the first nodes, wherein determining the first costs comprises determining a cost associated with a node of the subset of the first nodes based at least in part on the cost map and a similarity of the node to one or more other nodes;
   determining, based at least in part on the first costs, two or more nodes of the subset of the first nodes having lowest costs among the first costs associated with the subset of the first nodes;
   determining second nodes based at least in part on the two or more nodes;
   determining a path based at least in part on second costs associated with the second nodes and one or more of the first costs associated with the subset of the first nodes; and
   causing the vehicle to navigate along the path.

15. The non-transitory computer-readable medium of claim 14, wherein determining the second nodes is based at least in part on:
   determining a future position, velocity, and heading of the vehicle based at least in part on projecting a position, velocity, and heading associated with one of the two or more nodes according to a control policy; and
   a node of the second nodes is associated with a different control policy.

16. The non-transitory computer-readable medium of claim 14, wherein the node is a first node, and wherein the pruning technique comprises:
   determining, based at least in part on a first position within the environment of the first node from the first nodes, a first hash associated with the first node;
   determining, based at least in part on a second position within the environment of a second node from the first nodes, a second hash associated with the second node;
   determining that the first hash associated with the first node is similar to the second hash associated with the second node, and
   discarding the first node based at least in part on the first hash being similar to the second hash.

17. The non-transitory computer-readable medium of claim 14, wherein the path is a coarse path defining at least one of a position, heading, or velocity of the vehicle over multiple first time intervals and the operations further comprising:
   refining the coarse path based at least in part on defining a curvature of the path in addition to at least one of the position, heading, or velocity over multiple second time intervals, the second time intervals being shorter than the first time intervals.

18. The non-transitory computer-readable medium of claim 14, wherein:
   the future time is a first future time;
   the probability is a first probability;
   the operations further comprise determining a second cost map indicating a second predicted position of the dynamic object and a second probability that the dynamic object will occupy the second predicted position at a second future time later than the first future time;
   and
   the second costs are based at least in part on the second probability.

19. The non-transitory computer-readable medium of claim 14, wherein the cost is a first cost and determining the cost map comprises determining a second cost associated with at least one of a position, heading, velocity, or curvature in a parameter space associated with the environment, wherein determining the cost is based at least in part on:
   determining a visitation cost based at least in part on a deviation of at least one of the position, heading, velocity, or curvature from a current position, heading, velocity, or curvature of the vehicle or a target lane;
   determining a proximity of the position to a static object, a proximity of the position to the predicted position, or the probability; or
   determining a deviation of the position, heading, velocity, or curvature from the path or a path reference.

20. The non-transitory computer-readable medium of claim 14, wherein the node is a first node and determining the cost associated with the first node of the subset of first nodes further comprises determining a weight based at least in part on at least one of:
   a similarity of the first node to a second node of the subset of first nodes;
   a difference between a lateral position of the first node compared to lateral positions of one or more other nodes of the subset of first nodes; or
   a distance along the path associated with the first node.

* * * * *